(12) United States Patent
Taki

(10) Patent No.: US 7,545,275 B2
(45) Date of Patent: Jun. 9, 2009

(54) ARTICLE MANAGEMENT DEVICE, ARTICLE MANAGEMENT SYSTEM, ARTICLE MANAGEMENT METHOD, AND RFID-TAG PRODUCING APPARATUS

(75) Inventor: Kazunari Taki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 528 days.

(21) Appl. No.: 11/496,023

(22) Filed: Jul. 31, 2006

(65) Prior Publication Data

US 2006/0290493 A1 Dec. 28, 2006

Related U.S. Application Data

(63) Continuation-in-part of application No. PCT/JP2005/000419, filed on Jan. 14, 2005.

(30) Foreign Application Priority Data

Jan. 29, 2004 (JP) ............................. 2004-021368
Jan. 29, 2004 (JP) ............................. 2004-021369

(51) Int. Cl.
*G08B 13/14* (2006.01)
(52) U.S. Cl. .................................................. 340/572.1
(58) Field of Classification Search ... 340/572.1–572.9, 340/10.1; 235/462.13, 462.14
See application file for complete search history.

(56) References Cited

U.S. PATENT DOCUMENTS 6,246,326 B1 * 6/2001 Wiklof et al. ............ 340/572.1
6,327,972 B2 * 12/2001 Heredia et al. ................ 101/35
6,593,853 B1 * 7/2003 Barrett et al. ............ 340/572.1

FOREIGN PATENT DOCUMENTS

| JP | 2001 134724 | 5/2001 |
| JP | 2002 8067 | 1/2002 |
| JP | 2002 87541 | 3/2002 |
| JP | 2002 145419 | 5/2002 |
| JP | 2003 252441 | 9/2003 |

OTHER PUBLICATIONS

International Search Report for International Application No. PCT/JP2005/000419, dated Apr. 14, 2005.

* cited by examiner

*Primary Examiner*—Phung Nguyen
(74) *Attorney, Agent, or Firm*—Baker Botts L.L.P.

(57) ABSTRACT

An article management device for management of a plurality of articles handled as a set consisting of a main article and accessory article, by using a first RFID tag attached to the main article and second RFID tag attached to the at least one accessory article, the article management device including a communicating portion operable to read out information of all of the plurality of articles written on the first RFID tag, and information of each of the second article and information of the first article which are written on the second RFID tag, a control portion operable to effect a comparison of the information read out from the first RFID tag, with the information read out from the second RFID tag, and an indicator portion operable to indicate a result of the comparison by the control portion.

28 Claims, 14 Drawing Sheets

FIG.9

| PRINTING INFORMATION |
| --- |
| MEASURING DEVICE A |
| A-ADAPTER |
| A-CARD 1 |
| A-CARD 2 |
| A-CABLE 1 |
| A-CABLE 2 |
| A-CORD |
| A-INSTRUCTION MANUAL |

FIG.10

| ID NUMBER | PRINTING INFORMATION |
| --- | --- |
| A031121-00 | MEASURING DEVICE A |
| A031121-01 | A-ADAPTER |
| A031121-02 | A-CARD 1 |
| A031121-03 | A-CARD 2 |
| A031121-04 | A-CABLE 1 |
| A031121-05 | A-CABLE 2 |
| A031121-06 | A-CORD |
| A031121-07 | A-INSTRUCTION MANUAL |

FIG.11

| PRINTED IMAGE | WRITING INFORMATION | |
| --- | --- | --- |
| | ID NUMBER | PRINTING INFORMATION |
| MEASURING DEVICE A | A031121-00 | MEASURING DEVICE A |
| | A031121-01 | A-ADAPTER |
| | A031121-02 | A-CARD 1 |
| | A031121-03 | A-CARD 2 |
| | A031121-04 | A-CABLE 1 |
| | A031121-05 | A-CABLE 2 |
| | A031121-06 | A-CORD |
| | A031121-07 | A-INSTRUCTION MANUAL |

FIG. 12

| PRINTING IMAGE | WRITING INFORMATION ||
| --- | --- | --- |
| | ID NUMBER | PRINTING INFORMATION |
| A-ADAPTER | A031121-00 | MEASURING DEVICE A |
| | A031121-01 | A-ADAPTER |

FIG. 13

| PRINTING IMAGE | WRITING INFORMATION ||
| --- | --- | --- |
| | ID NUMBER | PRINTING INFORMATION |
| A-CABLE 1 | A031121-00 | MEASURING DEVICE A |
| | A031121-04 | A-CABLE 1 |

FIG.21

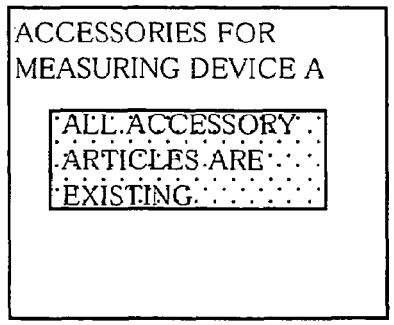

ACCESSORIES FOR
MEASURING DEVICE A

ALL ACCESSORY
ARTICLES ARE
EXISTING.

FIG.22

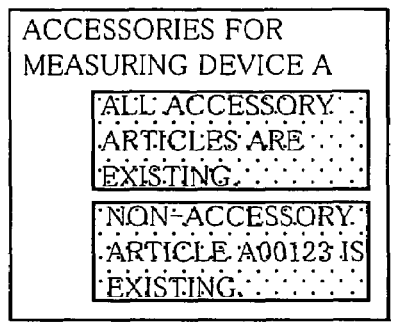

ACCESSORIES FOR
MEASURING DEVICE A

ALL ACCESSORY
ARTICLES ARE
EXISTING.

NON-ACCESSORY
ARTICLE A00123 IS
EXISTING.

FIG.23

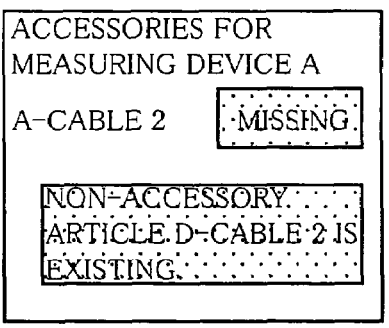

ACCESSORIES FOR
MEASURING DEVICE A

A-CABLE 2    MISSING

NON-ACCESSORY
ARTICLE D-CABLE 2 IS
EXISTING.

FIG.24

| PRINTING INFORMATION | COMPATIBILITY INFORMATION |
|---|---|
| MEASURING DEVICE A | MEASURING DEVICE D |
| A-ADAPTER | |
| A-CARD 1 | |
| A-CARD 2 | |
| A-CABLE 1 | CABLE 1 |
| A-CABLE 2 | CABLE 2 |
| A-CORD | CORD 3P |
| A-INSTRUCTION MANUAL | |

FIG. 25

| PRINTING IMAGE | WRITING INFORMATION |||
| --- | --- | --- | --- |
|  | ID NUMBER | PRINTING INFORMATION | COMPATIBILITY INFORMATION |
| MEASURING DEVICE A | M7 | | |
|  | A031121-00 | MEASURING DEVICE A | MEASURING DEVICE D |
|  | A031121-01 | A-ADAPTOR | |
|  | A031121-02 | A-CARD 1 | |
|  | A031121-03 | A-CARD 2 | |
|  | A031121-04 | A-CABLE 1 | CABLE 1 |
|  | A031121-05 | A-CABLE 2 | CABLE 2 |
|  | A031121-06 | A-CORD | CORD 3P |
|  | A031121-07 | A-INSTRUCTION MANUAL | |

FIG. 26

| PRINTING IMAGE | WRITING INFORMATION |||
| --- | --- | --- | --- |
|  | ID NUMBER | PRINTING INFORMATION | COMPATIBILITY INFORMATION |
| A-ADAPTOR | S1 | | |
|  | A031121-00 | MEASURING DEVICE A | MEASURING DEVICE D |
|  | A031121-01 | A-ADAPTOR | |

FIG. 27

| PRINTING IMAGE | WRITING INFORMATION |||
| --- | --- | --- | --- |
|  | ID NUMBER | PRINTING INFORMATION | COMPATIBILITY INFORMATION |
| A-CABLE 1 | S4 | | |
|  | A031121-00 | MEASURING DEVICE A | MEASURING DEVICE D |
|  | A031121-04 | A-CABLE 1 | CABLE 1 |

US 7,545,275 B2

ARTICLE MANAGEMENT DEVICE, ARTICLE MANAGEMENT SYSTEM, ARTICLE MANAGEMENT METHOD, AND RFID-TAG PRODUCING APPARATUS

The present application is a Continuation-in-Part of International Application No. PCT/JP2005/000419 filed Jan. 14, 2005, which claims the benefits of Japanese Patent Application Nos. 2004-021368 and 2004-021369 both filed Jan. 29, 2004.

BACKGROUND OF THE INVENTION

1. Field of the Invention

The present invention relates to an article management device, an article management system and article management method for managing a plurality of articles by communication with RFID tags, and an RFID-tag producing apparatus for producing RFID tags for administering the articles.

2. Description of the Related Art

JP-2002-87541 A discloses (on pages 3-5 and in FIG. 1) an article management system for managing a plurality of articles In this an article management system, an IC card is attached to each of the plurality of articles which are handled as a set. Each IC card stores ID numbers of the individual articles arranged in a predetermined order, such that the ID number of the article preceding the article to which the IC card is attached is indicated. The IC card attached to the first article stores the ID number of this first article and the ID number of the last article. Information stored in the IC card of the preceding article or the first article permits detection of missing of any one of the articles of the set, thereby permitting management of the set of articles.

Recently, there is available an automatic recognition system using RFID (radio frequency identification) tags for information transmission and reception in a non-contact fashion. The RFID tags take the form of labels to be attached to articles. For example, an RFID tag is attached to each of articles handled as a set, such as a main article and accessory articles. Each RFID tag stores an ID number of the corresponding article, so that the existing or missing of each article can be easily detected.

However, the conventional article management system capable of detecting the existing or missing of each article requires reference to a data base or an instruction manual of the main article, which identifies the accessory articles, in order to identify any article which is missing. Accordingly, the conventional system suffers from a cumbersome control of the articles.

SUMMARY OF THE INVENTION

The present invention was made in view of the background art described above. It is accordingly a first object of this invention to provide an article management device which uses RFID tags and permits easy management of a plurality of articles. A second object of the invention is to provide an article management system which uses RFID tags and permits easy management of a plurality of articles. A third object of the invention is to provide an article management method which permits easy management of a plurality of articles, by using RFID tags. A fourth object of the invention is to provide an RFID-tag producing apparatus suitable for producing the RFID tags.

The first object indicated above may be achieved according to a first aspect of this invention, which provides an article management device operable to read out information written on a plurality of RFID tags respectively attached to a plurality of articles handled as a set, for management of the plurality of articles, the plurality of articles consisting of a first article and at least one second article other than the first article, and the plurality of RFID tags including a first RFID tag attached to the first article, and at least one second RFID tag attached to the second article, the article management device comprising a communicating portion operable to read out information of all of the plurality of articles written on the first RFID tag, and information of each of the second article and information of the first article which are written on the second RFID tag, a control portion operable to effect a comparison of the information read out from the first RFID tag, with the information read out from the second RFID tag, and an indicator portion operable to indicate a result of the comparison effected by the control portion.

The article management device of the present invention may be arranged, for example, such that the information of a main article and the information of all of accessory articles are written on the first RFID tag attached to the main article, while the information of the main article and the information of each of the accessory articles are written on each of the second RFID tags. The communicating portion reads out information from the first and second RFID tags, and the control portion compares the information read out from the first RFID tag with the information read out from the second RFID tags.

If the comparison reveals that the main article and all of the accessory articles are existing, the indicator portion provides an indication that all of the plurality of articles are existing. If the comparison reveals the missing of the articles, the indicator portion indicates the article which is missing. Thus, the information written on the second RFID tag permits easy detection of the missing of the first article, while the information written on the first RFID tag permits easy detection of the missing of any of the second article such as the accessory articles other than the first article. Accordingly, the present article management device facilitates the management of the plurality of articles handled as a set.

In a first preferred form of the article management device of the present invention, the control portion commands the indicator portion to indicate the missing of the second article when said control portion has determined that there is information which is not included in the information read out from all of the second RFID tags and included in the information read out from the first RFID tag. Where the plurality of articles include a main article and accessory articles, the missing of the accessory articles is indicated by the indicator portion if the comparison of the information read out from the first RFID tag attached to the main article with the information read out from the second RFID tags attached to the respective accessory tags reveals that the information read out from all of the second RFID tags does not include information read out from the first RFID tag. Thus, the present article management device permits easy detection of the missing of any of the second articles such as the accessory articles, and facilitates the management of the plurality of articles handled as a set.

In a second preferred form of the article management device of the present invention, the control portion compares each of the information which has been read out from the first RFID tag in every article by the communicating portion and which indicates the second article, sequentially with the information read out from the RFID tag by the communicating comparison in every article by the control portion, when the information portion, and commands the indicator portion to indicate the result of the read out from the first RFID tag is compared with the information read out from the second RFID tag.

According to the second preferred form of the article management device, the information read out from the first RFID tag and the information read out from the second RFID tag are temporarily stored, so that the information which has been read out from the first RFID tag in every article and which indicates the second article (e.g., accessory article) is compared with the information read out from the second RFID tag. If the comparison of the information read out from the first RFID tag with the information read out from the second RFID tag reveals the missing of the second article, the indicator portion indicates the missing of this second article. The indicator portion indicates the results of the comparisons of the information read out from the first RFID tag with the information read out from the second RFID tag. Thus, the present article management device permits easy detection of the missing of any of the second article.

In a third preferred form of the article management device of the invention, the control portion commands the indicator portion to indicate the missing of the first article together with the information of the first article, on the basis of the information read out from the second RFID tag, when the communicating portion has not received the information from the first RFID tag. This form of the article management device is arranged such that when the communicating portion has not received the information from the first RFID tag, the control portion commands the indicator portion to indicate the missing (miss) of the first article and the information of the first article, by reference to the information of the article management device permits easy detection of any of the second article and facilitates the management of the plurality of articles handled as a set.

In a first advantageous arrangement of the above-described third preferred form of the article management device of the invention, the control portion commands the indicator portion to indicate the missing of the first article together with the information of the first article, on the basis of the information read out from the second RFID tag, when the communicating portion has not received identification information identifying the first tag, from the first RFID tag. In the present article management device, the identification information identifying the first RFID tag is stored on the first RFID tag, and the indicator portion indicates the missing of the first article when the communicating portion has not received the identification information from the first RFID tag. The present article management device permits efficient detection of the missing of the first article.

In a second advantageous arrangement of the above-described third preferred form of the article management device of the invention, the control portion commands the indicator portion to indicate the missing of the first article together with the information of the first article, on the basis of the information read out from the second RFID tag, when the communicating portion has not received information indicative of at least three articles of the plurality of articles, from any of the plurality of RFID tags. In this article management device, the information of the first article (e.g., main article) and the information of the second article (e.g., accessory article) are stored in the first RFID tag, and the control portion determines that the RFID tag storing the information indicative of at least three articles is the first article. The present article management device permits easy detection of the first article. If the communicating portion has received the information indicative of the two articles of the plurality of articles from the first RFID tag, the existing (existence) or missing of the first article is determined by comparing the information read out from the first RFID tag with the information read out from the second RFID tag.

In a fourth preferred form of the article management device of the invention, the control portion commands the indicator portion to indicate the existing of an article other than the plurality of articles handled as the set, when the communicating portion has received information from an RFID tag not corresponding to the information which have been read out from the first RFID tag and which respectively indicate the plurality of articles handled as the set. In this article management device, the indicator portion indicates the existing of an article other than the plurality of articles handled as a set, when the communicating portion has received information from an RFID tag other than the first and second RFID tags, namely, information indicative of an article not indicated by the information read out from the first RFID tag. Thus, the present article management device permits easy detection of the existing of any articles other than the plurality of articles handled as a set.

In a fifth preferred form of the article management device of the invention, compatibility information indicative of at least one compatible article each interchangeable with any one of the plurality of articles is written on the first RFID tag, and when said control portion has determined that there is information which is not included in the information read out from all of the second RFID tags and included in the information read out from the first RFID, and that the information read out from the second RFID tag includes information indicative of the compatible article indicated by the compatibility information read out from the first RFID tag, the control portion determines that the above-indicated compatible article which is interchangeable with the above-indicated second article is existing, rather than determines that the second article is missing.

According to the fifth preferred form of the article management device, the compatibility information indicative of compatible article each compatible or interchangeable with the second article (e.g., accessory articles) is written on the first RFID tag. If the comparison of the information read out from the first RFID tag with the information read out from the second RFID tag reveals the missing of any second article (e.g., any one of accessory articles), and if the information read out from the second RFID tag includes information indicative of the compatible article indicated by the compatibility information read out from the first RFID tag, the control portion commands the indicator portion to indicate the existing of the above-indicated compatible article which is interchangeable with the above-indicted second article, rather than the missing of the above-indicated second article, or indicate that the above-indicated second article is replaced by the above-indicated compatible article. Thus, the present article management device facilitates the management of the plurality of articles handled as a set, regarding the compatibility or interchangeability of the second article or articles.

In a sixth preferred form of the article management device of the invention, the indicator portion includes a display portion operable to display the result of the comparison effected by the control portion. The display portion enables the user of the article management device to easily recognize the result of the comparison of the information received from the first RFID tag with the information received from the RFID tag.

In a first advantageous arrangement of the above-described sixth preferred form of the article management device, the control portion commands the display portion to display the information of the second article, on the basis of the information read out from the first RFID tag or the second RFID tag, when the comparison effected by the control portion reveals the missing of the above-indicated second article. In this arrangement, the display portion may be arranged to display the name of each second article which is missing. The display portion enables the user of the article management device to easily recognize the result of the comparison effected by the control portion.

In a second advantageous arrangement of the above-described sixth preferred form of the article management device, the control portion commands the display portion to display information of at least one article other than the plurality of articles handled as the set, on the basis of the information read out from the second RFID tag, when the comparison effected by the control portion reveals the existing of the article other than the plurality of articles. In this arrangement, the display portion may be arranged to display the name of the article other than the plurality of articles handled as the set. The display portion enables the user of the article management device to easily identify the article other than the first and second articles.

In a third advantageous arrangement of the above-described sixth preferred form of the article management device, the control portion commands the display portion to display information of at least one compatible article each interchangeable with any one of the second article, on the basis of the information read out from the second RFID tag, when the comparison effected by the control portion reveals the existing of the compatible article. In this arrangement, the display portion may be arranged to display the name of the compatible article. The display portion enables the user of the article management device to easily identify the compatible article.

In a fourth advantageous arrangement of the above-described sixth preferred form of the article management device, compatibility information indicative of compatible article each interchangeable with the first article is written on the second RFID tag, and when the comparison effected by the control portion reveals the missing of the first article, the control portion commands the display portion to display the information of the first article and information of the compatible article. In this arrangement, the display portion displays the information of the first article which is found missing, and the information of the compatible article interchangeable with the first article, on the basis of the information read out from the second RFID tag.

The second object indicated above may be achieved according to a second aspect of this invention, which provides an article management system operable to write information on a plurality of RFID tags to be respectively attached to a plurality of articles handled as a set, and read out the information from the plurality of RFID tags, for management of the plurality of articles, the plurality of articles consisting of a first article and at least one second article other than the first article, the plurality of RFID tags including a first RFID tag to be attached to the first article, and at least one second RFID tag to be attached to the second article, the article management system comprising: an RFID-tag producing apparatus operable to write information of all of the plurality of articles on the first RFID tag, and information of each of the second article and information of the first article on each of the second RFID tag, on the basis of information input thereto; and a article management device including a communicating portion operable to read out the information of all of the plurality of articles from the first RFID tag, and the information of each of the second article and the information of the first article from the second RFID tag, a control portion operable to effect a comparison of the information read out from the first RFID tag, with the information read out from the second RFID tag, and an indicator portion operable to indicate a result of the comparison by the control portion.

The article management system of the present invention may be arranged, for example, such that the information of a main article and the information of all of accessory articles are written on the first RFID tag attached to the main article, while the information of the main article and the information of each of the accessory articles are written on each of the second RFID tags. The communicating portion of the article management device reads out information from the first and second RFID tags, and the control portion compares the information read out from the first RFID tag with the information read out from the second RFID tags.

If the comparison reveals that the main article and all of the accessory articles are existing, the indicator portion provides an indication that all of the plurality of articles are existing. If the comparison reveals the missing of the articles, the indicator portion indicates the article which is missing. Thus, the comparison permits easy detection of the missing of any of the plurality of articles. Accordingly, the present article management system facilitates the management of the plurality of articles handled as a set.

In a first preferred form of the article management system, the RFID-tag producing apparatus is operable to write identification information identifying the first RFID tag on the first RFID tag, and identification information identifying the second RFID tag on the second RFID tag. In this form of the article management system, the article management device detects the existing or missing of the first article, on the basis of the identification information. Accordingly, the present article management system permits efficient detection of the existing or missing of the first article.

In a second preferred form of the article management control system, the RFID-tag producing apparatus is operable to write information indicative of the number of all of the plurality of articles, on the first RFID tag. In this form of the article management system, the article management device detects the missing of the plurality of articles, on the basis of the information indicative of the number of the plurality of articles. Accordingly, the present article management system permits efficient detection of the missing of any article, by comparing the number indicated by the information with the number of the detected RFID tags.

In a third preferred form of the article management system, the RFID-tag producing apparatus includes a printing portion operable to perform a printing operation on a medium which incorporates the plurality of RFID tags. In this form of the article management system, the information indicative of each of the plurality of articles, for example, the name of each article is printed on the medium such as a label which incorporates the corresponding RFID tag. Accordingly, the user can easily visually identify each of the articles.

In a fourth preferred form of the article management system, the control portion commands the indicator portion to indicate the missing of the second article, when said control portion has determined that there is information which is not included in the information read out from all of the second RFID tags and included in the information read out from the first RFID.

In the fourth preferred form of the article management system, the missing of second article is indicated by the indicator portion, when the information read out from all of the second RFID tags does not include information read out from the first RFID tag. Accordingly, the present article management system permits easy detection of any second article, thereby facilitating the management of the plurality of articles handled as a set.

In a fifth preferred form of the article management system, the control portion commands the indicator portion to indicate the missing of the first article together with the information of the first article, on the basis of the information read out from the second RFID tag, when the communicating portion has not received the information from the first RFID tag.

In the fifth preferred form of the article management system, the missing of the first article is indicated by the indicator portion when the communicating portion has not received the information from the first RFID tag. Accordingly, the present article management permits easy detection of the missing of the first article, thereby facilitating the management of the plurality of articles handled as a set.

The third object indicated above may be achieved according to a third aspect of this invention, which provides an article management method for management of a plurality of articles handled as a set, by writing information on a plurality of RFID tags to be respectively attached to the plurality of articles, and reading out the information from the plurality of RFID tags, the plurality of articles consisting of a first article and at least one second article other than the first article, the plurality of RFID tags including a first RFID tag to be attached to the first article, and at least one second RFID tag to be attached to the second article, the article management method comprising: reading out information of all of the plurality of articles from the first RFID tag attached to the first article, and information of each of the second article and information of the first article from the second RFID tag attached to the second article; effecting a comparison of the information read out from the first RFID tag, with the information read out from the second RFID tag; and indicating a result of the comparison.

In the article management method of the present invention, the information of all of the plurality of articles is read out from the first RFID tag attached to the first RFID tag, and the information of the second article and the information of the first article are read out from the second RFID tag attached to the second article. The information read out from the first RFID tag is compared with the information read out from the RFID tag, and the result of this comparison is indicated. Accordingly, the present article management method permits easy detection of any of the plurality of articles, thereby facilitating the management of the plurality of articles handled as a set.

The fourth object indicated above may be achieved according to a fourth aspect of this invention, which provides an RFID-tag producing apparatus operable to write information on a plurality of RFID tags to be respectively attached to a plurality of articles handled as a set, the plurality of articles consisting of a first article and at least one second article other than the first article, the plurality of RFID tags including a first RFID tag to be attached to the first article, and at least one second RFID tag to be attached to the second article, the RFID-tag producing apparatus comprising: an input portion operable to input information specifying each of the plurality of articles; and a control portion operable to write information of the plurality of articles on the first RFID tag, and information each of the second article and information of the first article on each of the second RFID tag, on the basis of the information input by the input portion.

In the RFID-tag producing apparatus of the present invention, the information such as the names of the plurality of information handled as a set, such as a man article and at least one accessory article, for example, is input through the input portion, and the names of all of the articles are stored in the first RFID tag to be attached to the main article. In each of the second RFID tag to be attached to the accessory article, the name of the first article and the name of the accessory article are stored. The management of the plurality of articles is effected by effecting a comparison of the information read out from the first RFID tag, with the information read out from the second RFID tag. The input portion may include an operator's control portion of the apparatus, or a personal computer connected to the apparatus by wire or in a wireless fashion.

Accordingly, the present RFID-tag producing apparatus permits easy production of the RFID tags to be attached to the plurality of articles handled as a set, for detecting the missing of any of the plurality of articles. Where the RFID tags have a relatively small storage capacity, the information of the articles such as the names of the articles may be stored in an external data base, and each of the RFID tags stores information indicative of the addresses of the data base, for example.

According to a first preferred form of the RFID-tag producing apparatus, wherein the information input through the input portion specifies each of the plurality of articles so as to distinguish the first article and the at least second article from each other, and the control portion is operable to generate identification information identifying the first RFID tag and the second RFID tag, on the basis of the information input through the input portion, and writes the generated identification information on the first and second RFID tags. In this form of the RFID-tag producing apparatus, the first and second RFID tags can be identified on the basis of the identification information read out from the first and second RFID tags. Accordingly, the present apparatus permits production of the RFID tags that can be efficiently identified.

In a second preferred form of the RFID-tag producing apparatus, the control portion is operable to write information indicative of the number of all of the plurality of articles on the first RFID tag, on the basis of the information input through the input portion. This form of the RFID-tag producing apparatus permits detection of the missing of any article, by comparing the number indicated by the information with the number of the detected RFID tags, thereby facilitating determination of the number of the articles that are missing.

In a third preferred form of the RFID-tag producing apparatus, the control portion is operable to write compatibility information indicative of at least one compatible article each interchangeable with any one of the plurality of articles, together with the information specifying each of the plurality of articles, on the first and second RFID tags, when the compatibility information is input through the input portion.

In the third preferred form of the RFID-tag producing apparatus, the names of a main article and accessory articles, for example, and the compatibility information indicative of compatible article interchangeable with the plurality of articles are input through the input portion. In this case, the control portion writes the name of the main article and the compatibility information on the first RFID tag, while the name of the accessory article and the compatibility information are written on each second RFID tag.

If information indicative of any compatible indicated by the compatibility information written on the first or second RFID tag is received from any RFID tag other than the first and second RFID tags, the indicator portion of the article management device described above may be commanded to indicate the existing of the compatible article, or provide an indication that any of the first and second articles is replaced by the compatible article. The compatibility information may be prepared and stored in a data base, so that reference is made to the data base upon inputting of the information specifying each article, to add the compatibility information to the information specifying the article, whereby the compatibility information as well as the article specifying information are written on each of the first and second RFID tags.

The RFID-tag producing apparatus according to a fourth preferred form of the fourth aspect of the invention further comprises a cartridge in which a roll of a tape is accommodated, and a label making portion operable to cut the tape fed from the roll into labels each having a predetermined length, the tape incorporating a plurality of RFID-tag circuits such that the RFID-tag circuits are spaced apart from each other by a predetermined distance equal to the predetermined length, in a longitudinal direction of the tape, the plurality of RFID tags being produced by writing the information specifying the respective articles on the RFID-tag circuits, respectively.

In this form of the RFID-tag producing apparatus, the tape is fed from the cartridge, and is cut into successive labels each including the RFID-tag circuit on which the information of the article is stored. Thus, the first and second RFID tags are successively produced. The RFID-tag circuits are bonded to or laminated on the tape such that the RFID-tag circuits are spaced apart from each other by the predetermined distance.

The RFID-tag producing apparatus according to one advantageous arrangement of the fourth preferred form further comprises a printing portion operable to perform a printing operation on the tape. In this arrangement, the name of each article is printed on the tape, for example, and the information of the article is written on the RFID-tag circuit incorporated in the corresponding label prepared by cutting the tape.

The RFID-tag producing apparatus according to a fifth preferred form of the fourth aspect of the invention further comprises a printing portion operable to perform a printing operation on a medium which incorporates a plurality of RFID-tag circuits, the plurality of RFID tags being produced by writing the information specifying the respective articles on the RFID-tag circuits, respectively. In this form of the RFID-tag producing apparatus, the name of each article is printed on the medium in the form of a label, for example, and the information of the article is written on the RFID-tag circuit incorporated in the medium.

In one arrangement of the advantageous arrangement of the fourth preferred form of the RFID-tag producing apparatus, or in one advantageous arrangement of the fifth preferred form of the RFID-tag producing apparatus, the control portion is operable to write information printed by the printing portion, on the first and second RFID tags. In this arrangement, the information printed by the printing portion on each of the first and second RFID tags is written on the corresponding RFID tag. Accordingly, it is possible to indicate the missing of any of the articles, by using the information printed on the corresponding RFID tag (on the tape or medium), for example, by indicating the name of the missing article.

BRIEF DESCRIPTION OF THE DRAWINGS

The above and other objects, features and industrial significance of this invention will be better understood by reading the following detailed description of preferred embodiments of the present invention, when considered in connection with the accompanying drawings in which:

FIG. 9 is a view showing printing information input to the RFID-tag producing apparatus of the first embodiment of the invention;

FIG. 10 is a view showing writing information generated on the basis of the printing information input to the RFID-tag producing apparatus of the first embodiment;

FIG. 11 is a view showing a printed image formed on a main tag by the RFID-tag producing apparatus of the first embodiment, and writing information for writing on the main tag;

FIG. 12 is a view showing a printed image formed on an accessory tag by the RFID-tag producing apparatus of the first embodiment, and writing information for writing on the accessory tag;

FIG. 13 is a view showing a printed image formed on another accessory tag by the RFID-tag producing apparatus of the first embodiment, and writing information for writing on this accessory tag;

FIG. 21 is a view showing a further view provided on the display portion of the article management device;

FIG. 22 is a view showing a still further view provided on the display portion of the article management device;

FIG. 23 is a view showing a yet further view provided on the display portion of the article management device;

FIG. 24 is a view showing printing information input to a RFID-tag producing apparatus constructed according to a second embodiment of this invention;

FIG. 25 is a view showing a printed image formed on a main tag produced by the RFID-tag producing apparatus of the embodiment of the invention, and writing information for writing on the main tag;

FIG. 26 is a view showing a printed image formed on an accessory tag by the RFID-tag producing apparatus of the second embodiment, and writing information for writing on the accessory tag; and FIG. 27 is a view showing a printed image formed on another accessory tag by the RFID-tag producing apparatus of the second embodiment, and writing information for writing on this accessory tag.

DETAILED DESCRIPTION OF THE PREFERRED EMBODIMENTS

Figure 1:
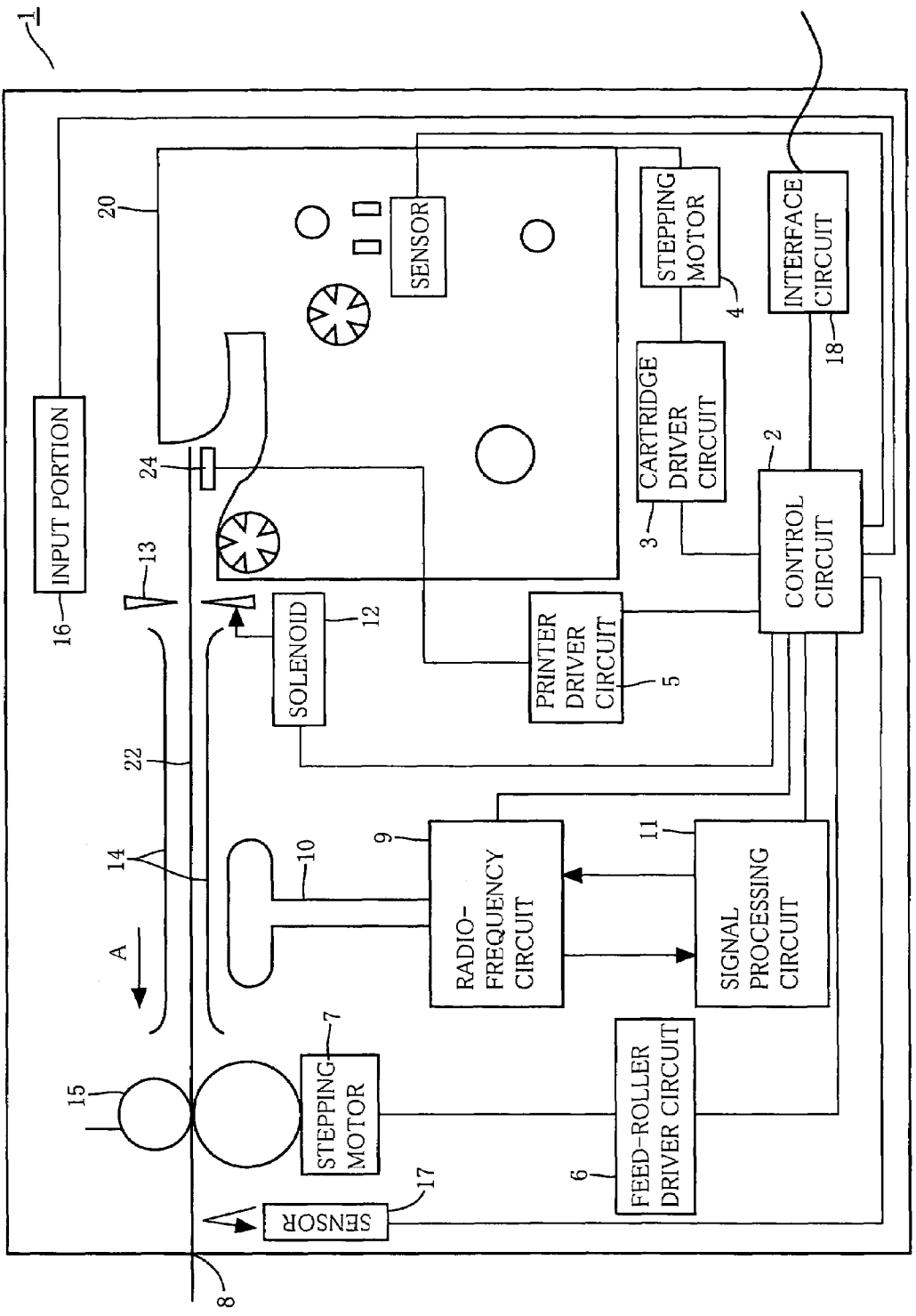
FIG. 1 is a block diagram showing an arrangement of an RFID-tag producing apparatus constructed according to a first embodiment of this invention.
Figure 15:
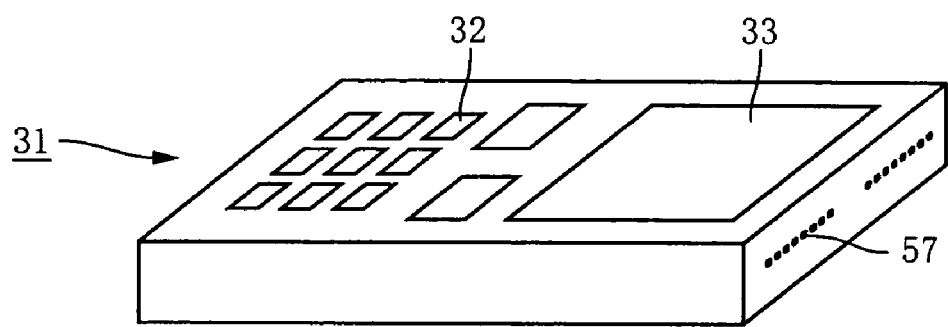
FIG. 15 is a perspective view showing an article management device for managing articles by using the RFID tags produced by the RFID-tag producing apparatus of the first embodiment.

The preferred embodiments of the present invention will be described in detail by reference to the drawings. Reference is first made to the block diagram of FIG. 1 showing an RFID-tag producing apparatus 1, which is a part of an article management system according to a first embodiment of the present invention. The article management system includes the RFID-tag producing apparatus 1, and an article management device 31 shown in FIGS. 15 and 16.

The RFID-tag producing apparatus 1 houses a cartridge 20 which accommodates a roll of a tape 22, and is arranged to perform a printing operation on the tape 22, cut the printed tape 22 into RFID tags 101 in the form of labels (shown in FIGS. 3-5), and write information on an RFID-tag circuit 108 (shown in FIG. 6) provided on each RFID tag 101.

Figure 3:
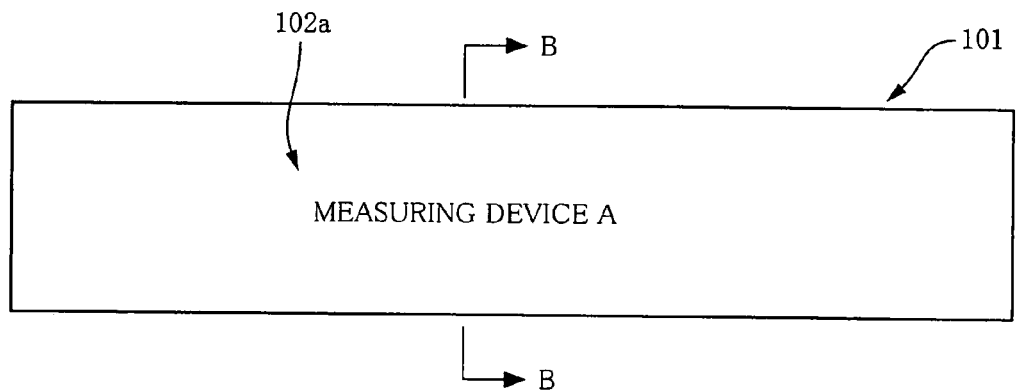
FIG. 3 is a top plan view illustrating an RFID tag.
Figure 4:
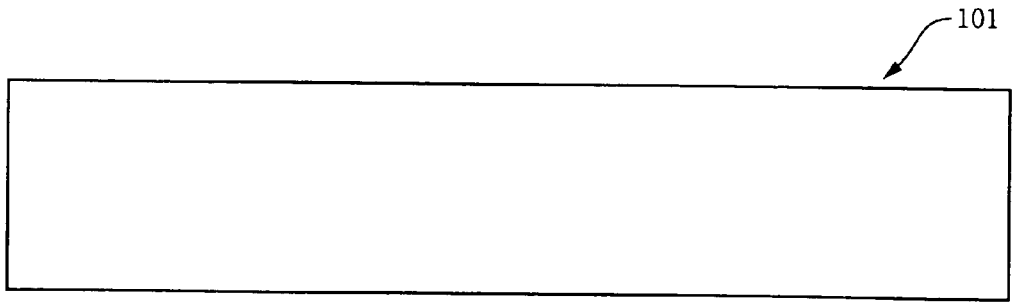
FIG. 4 is a bottom plan view of the RFID tag.
Figure 5:
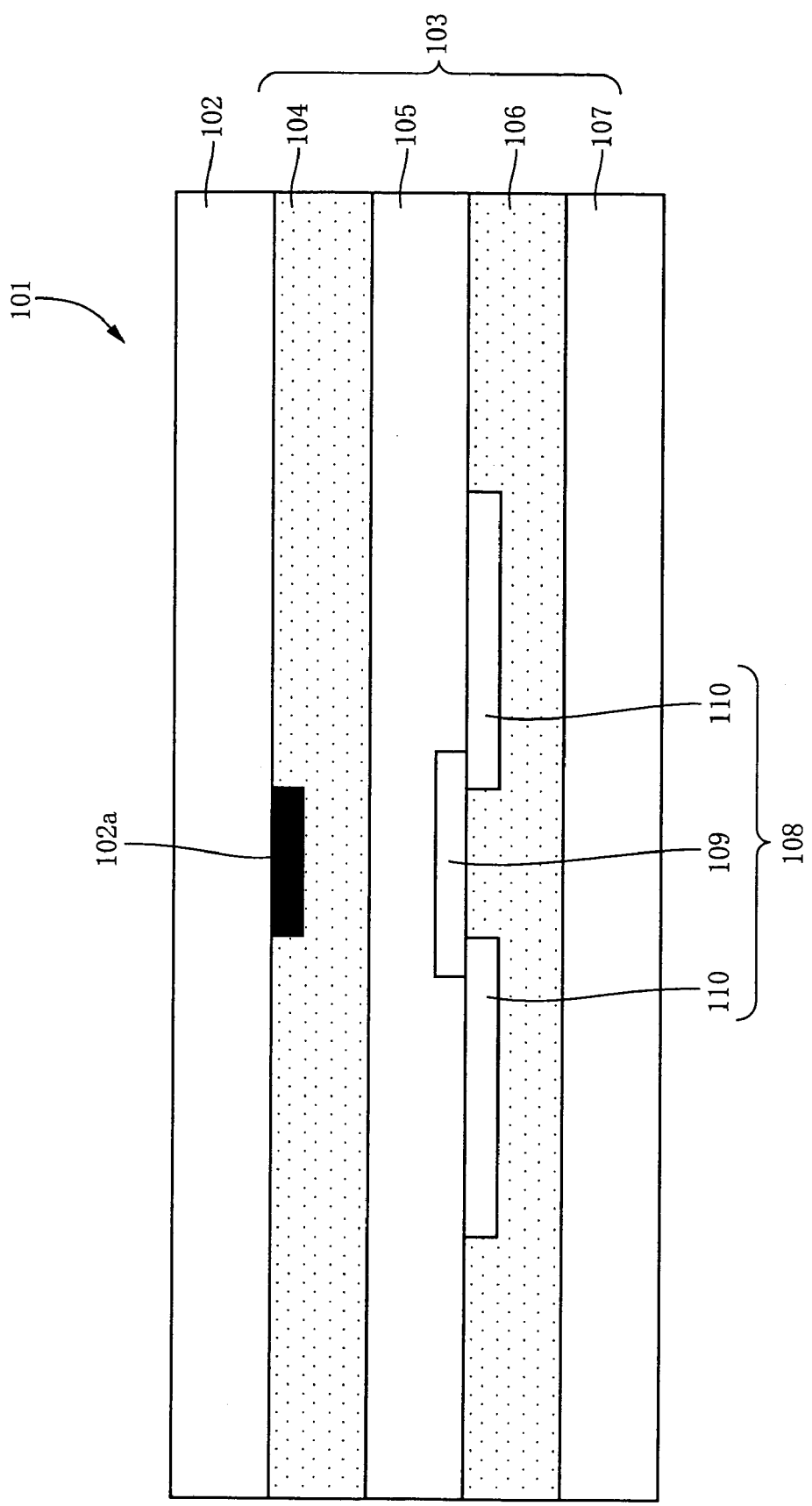
FIG. 5 is a cross sectional view of the RFID tag.

Referring to the top and bottom plan views of FIGS. 3 and 4 showing the RFID tag 101 in the form of a label, and the cross sectional view of FIG. 5 taken along line B-B of FIG. 3, the RFID tag 101 is a five-layer structure consisting of a covering film 102 on which a printing operation has been performed, and a laminar body 103 which incorporates the RFID-tag circuit 108 and consists of four layers.

The covering film 102 carries a printed image 102a formed on its back surface. In the present embodiment, the printed image 102a consists of characters which read "MEASURING DEVICE A" indicating the type of the RFID tag 101. The laminar body 103 consists of an adhesive layer 104, a base film 105, a tacky layer 106 and a releasing paper layer 107, which are laminated on the covering film 102 in the order of description. The RFID-tag circuit 108 consists of an IC-circuit portion 109 and a coil antenna 110, and is formed on the back surface of the base film 105.

Figure 2:
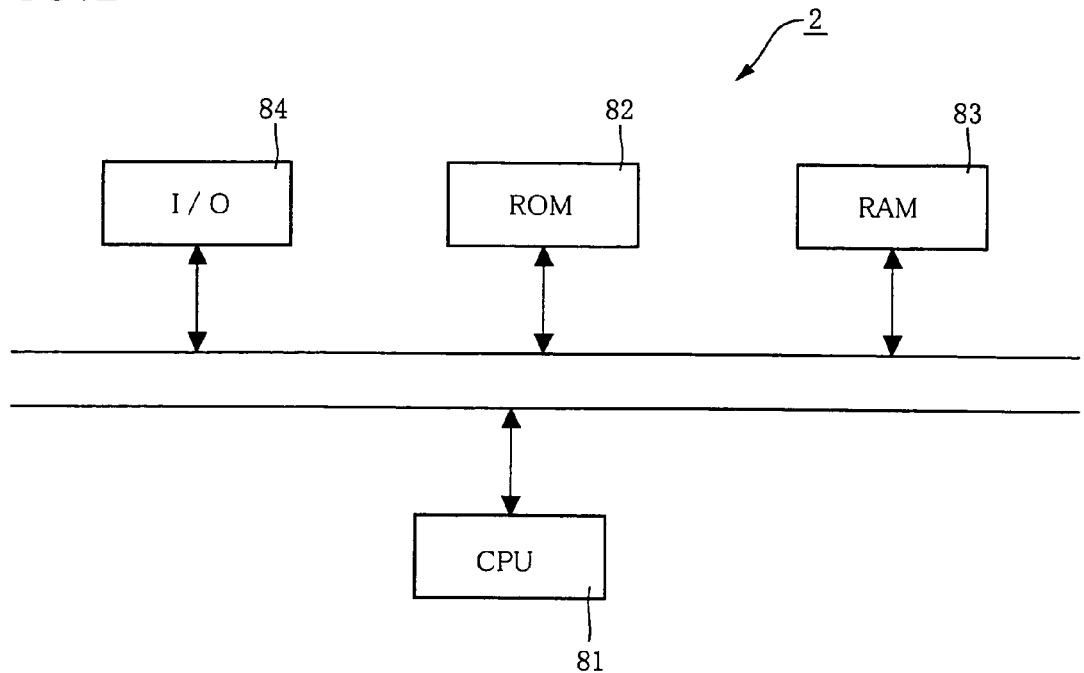
FIG. 2 is a block diagram showing an arrangement of a control portion of the RFID-tag producing apparatus of the first embodiment of the invention.

The RFID-tag producing apparatus 1 includes a control circuit 2 for controlling various portions thereof. As shown in FIG. 2, the control circuit 2 incorporates a CPU 81, a ROM 82, a RAM 83 and an I/O portion 84. The CPU 81 of the control circuit 2 performs various control operations, and the ROM 82 stores control programs used by the CPU 81. The RAM 83 performs a temporary data storage function during an operation of the CPU 81 according to the control programs. To the I/O portion 84, there are connected various circuits.

To the control circuit 2, there are connected a cartridge driver circuit 3, a printer driver circuit 5, a feed-roller driver circuit 6, a radio-frequency circuit 9, a signal processing circuit 11, a solenoid 12, an input portion 16, a sensor 17, and an interface circuit 18. The cartridge driver circuit 3 drives a stepping motor 4 to feed the tape 22 from the cartridge 20. The feed-roller drive circuit 6 drives a stepping motor 7 to rotate feed rollers 15 for feeding the tape 22 in a direction indicated by arrow-headed line A in FIG. 1.

The printer driver circuit 5 drives a thermal print head 24 which is disposed in the cartridge 20 such that the thermal print head 24 is opposed to the tape 22, to perform a printing operation on the tape 22. Thus, the printer driver circuit 5 and the thermal print head 24 constitute a printing portion operable to perform the printing operation on the tape 22. The radio-frequency circuit 9 is arranged to write information on the RFID tag 101 through an antenna portion 10. The signal processing circuit 11 is arranged to process signals read from the RFID tag 101, for thereby reading the information written on the RFID tag 101.

The solenoid 12 is provided to drive a cutter 13 to cut the tape 22 into the labels of a predetermined length serving as the RFID tags 101. It will be understood that the cartridge driver circuit 3, stepping motor 4, feed-roller driver circuit 6, feed rollers 15, solenoid 12 and cutter 13 cooperate to constitute a label making portion operable to feed the tape 22 and cut it to make the labels successively.

The input portion 16 is provided to enter printing information for performing the printing operation on the tape 22, and writing information for writing information on the RFID tags 101. The sensor 17 is provided to detect the existing or missing of the RFID tag 101 at an outlet 8 of the RFID-tag producing apparatus 1. The interface circuit 18 is provided for connection of the RFID-tag producing apparatus 1 to external devices such as personal computers, so that the printing information for the printing operation on the tape 22 and the information to be written on the RFID tags 101 can be received from the external devices. A feeding guide 14 is disposed between the cutter 13 and the outlet 8, for guiding the RFID tags 101 to the outlet 8.

Figure 6:
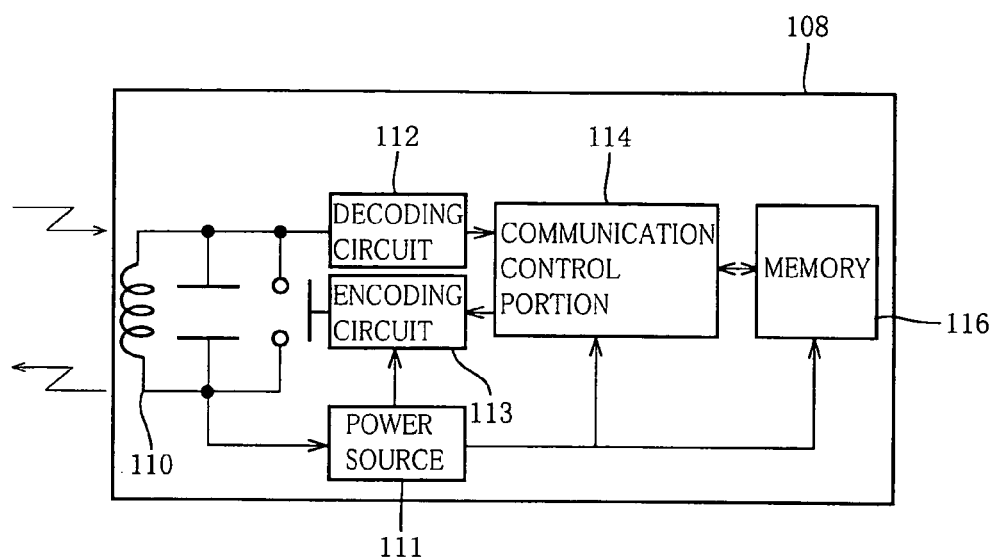
FIG. 6 is a block diagram showing an arrangement of an RFID-tag circuit.

Referring next the block diagram of FIG. 6, there is shown a general arrangement of the above-described RFID-tag circuit 108 of each RFID tag 101. The RFID-tag circuits 108 are disposed on the back surface of the base film 105, and are spaced apart from each other by a predetermined distance in the longitudinal direction of the tape 22. The RFID-tag circuit 108 is communicable with external devices through the coil antenna 110, using a radio frequency within a band of 13 MHz or 125 kHz. To the coil antenna 110, there are connected a decoding circuit 112 and a encoding circuit 113, which are arranged to decode and encode data received and to be transmitted through a communication control portion 114.

The RFID tag 101 includes a memory 116 for storing the decoded data under the control of the communication control portion 114. The stored data are retrieved from the memory 116 by the communication control portion 114, and are encoded to be transmitted from the coil antenna 110. The memory 116 is a non-volatile memory such as an EEPROM, which retains the stored data even in the event of a power failure.

Figure 7:
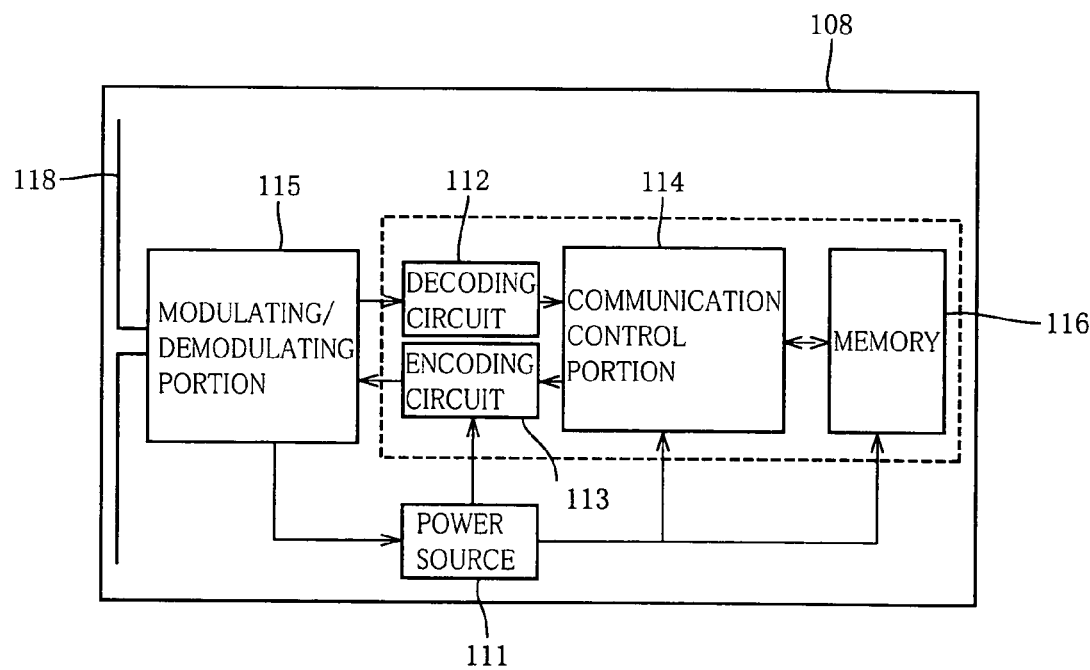
FIG. 7 is a block diagram showing an arrangement of an RFID-tag circuit used where a relatively high radio frequency is used for communication.

A power source 111 is provided to store an electric energy received through the coil antenna 110, and to supply the electric energy to the decoding circuit 113, encoding circuit 112, communication control portion 114 and memory 116. Where the RFID tag 108 uses a radio frequency within a band of 900 MHz or 2.45 GHz, the RFID tag 108 is provided with a dipole antenna 118 and a modulating/demodulating circuit 115 incorporating diodes, as shown in FIG. 7.

Figure 14:
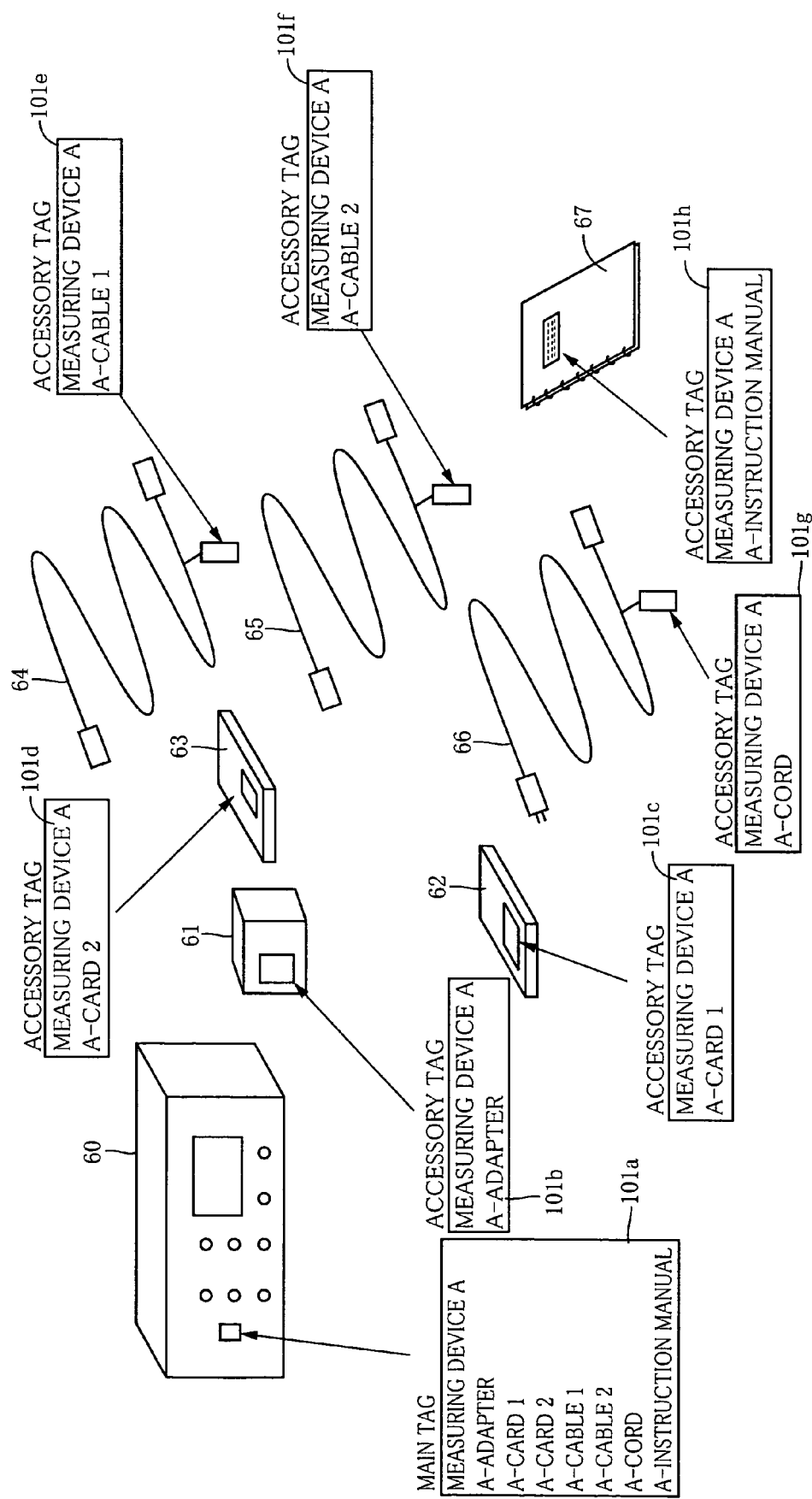
FIG. 14 is a view showing the RFID tags produced by the RFID-tag producing apparatus of the first embodiment and attached to the respective articles.

Referring to the flow chart of FIG. 8, there will be described an operation of the RFID-tag producing apparatus 1 constructed as described above. Step #11 is initially implemented to receive the printing information for the printing operation on the tape 22, from an appropriate external device such as a personal computer through the interface circuit 18, or to input the printing information through the input portion 16. FIG. 9 shows an example of the printing information, which includes the name "MEASURING DEVICE A" of a main article (first article) 60, and the names of accessory articles 61-67. The articles 60-67 are shown in FIG. 14. Although the printing information includes the names of the articles in this specific example, the printing information may include any other information which specifies the articles.

Step #12 is then implemented to determine whether only the printing operation is to be performed on the tape 22, or the printing operation is followed by an operation to write information on the RFID tag 101. If only the printing operation is to be performed, the control flow goes to step #13 to prepare the writing information for writing information on the RFID tag 101. FIG. 10 shows an example of the information to be written, which includes the printing information of all of the articles 60-67, and ID numbers of the articles 60-67. The information to be written may further include dates, names of persons responsible for management, and any other information desired.

In step #14, the printing information is transmitted to the control circuit 2 and stored in the RAM 82. In step #15, the writing information is transmitted to the control circuit 2 and stored in the RAM 82. Step #16 is then implemented to read out from the RAM 82 a first item of the printing information. In the following step #17, the control circuit 2 activates the cartridge driver circuit 3 and the printer driver circuit 5, to perform the printing operation on the tape 22.

Then, step #18 is implemented to determine whether the first item of the printing information has been read out from the RAM 82. The first item of the printing information is used to produce the RFID tag 101 to be attached to the main article (first article) 60, namely, a main tag (first RFID tag) 101a. If an affirmative decision (Yes) is obtained in step #18, the control flow goes to step #19 to read out from the RAM 82 the writing information for all of the articles 60-67.

In step #20, the control circuit 2 commands the signal processing circuit 11 and the radio-frequency circuit 9 to transmit through the antenna portion 10 the coded information to be written on the main tag 101a, so that the information of all of the articles 60-67 is stored in the memory 116 of the main tag 101a, as indicated in FIG. 14. Step #21 is then implemented to read out from the RAM 82 the writing information for the main article 60, and step #22 is implemented to store the read out writing information in a predetermined address of the RAM 82, so that the writing information of the main article 60 can be retrieved when needed.

The control flow then goes to step #23 in which the control circuit 2 commands the feed-roller drive circuit 6 to rotate the feed rollers 15 for feeding the tape 22. In the next step #24, the control circuit 2 energizes the solenoid 12 to operate the cutter 13 for cutting the tape 22 at a suitable position, for thereby producing the main tag 101a. FIG. 11 shows the printed image formed on the main tag 101a, and the information written on the main tag 101a. Namely, the main tag 101a carries the printed image 102a which reads "MEASURING DEVICE A" indicative of the main article 60, and the memory 116 of the main tag 101a stores the information of all of the articles 60-67.

The control flow then goes to step #25 to determine whether the item of the printing information which has been read out from the RAM 82 is the last item for the last article 67. If a negative decision (No) is obtained in step #25, the control flow goes to step #26 to shift a pointer of the RAM 82 to the next address, and goes back to step #16 to read out the next item of the printing information. In the next step #17, the printing operation is performed on the tape 22 according to the read-out item of the printing information, so that the name "A ADAPTER" of the first accessory article 61 is printed on the tape 22. In this case, a negative decision (No) is obtained in the next step #18, since the read-out item of the printing information is not the first item, so that the control flow goes to steps #31-#34 for writing the information on the first accessory article 61, to produce the RFID tag 101 to be attached to the first accessory article 61, namely, an accessory tag 101b (one of second RFID tags) for the first accessory article 61.

In the step #31, the writing information for the main article 60 stored in the RAM 82 in the step #22 is read out from the RAM 82. In the next step #32, the control circuit 2 commands the signal processing circuit 11 and the radio-frequency circuit 9 to transmit through the antenna portion 10 the coded information of the main article 60, so that the information of the main article 60 is stored in the memory 116. Step #33 is then implemented to read out from the RAM 82 the writing information for the present accessory article, in this case, the first accessory article 61 the name "A ADAPTER" of which has been printed in the step #17. In the next step #34, the control circuit 2 commands the signal processing circuit 11 and the radio-frequency circuit 9 to transmit through the antenna portion 10 the coded information of the first accessory article 61, so that the information of the accessory article 61 is stored in the memory 116 of the accessory tag 101b to be produced for the accessory article 61, as indicated in FIG. 14. Thus, the information of the main article 60 and the information of the accessory article 61 are both stored in the memory 116.

The control flow then goes to the above-described steps #23-#26, and repeat the steps #16-#18 and #31-#34 and #23-#26 until an affirmative decision (Yes) is obtained in the step #25, that is, until the last item of the printing information has been read out to perform the printing operation to print the name "A-INSTRUCTION MANUAL" of the last accessory article 67, and the information of the last accessory article 67 has been written on the accessory tag 101h to be attached to the accessory article 67. Accordingly, the names of the accessory articles 62-67 are sequentially printed on the tape 22, and the information of the main article 60 and the information of the accessory articles 62-67 are stored in the memories 116 of the accessory tags 101c-101h. Thus, the accessory tags 101b-101h corresponding to the accessory articles 61-67 are produced. When the affirmative decision (Yes) is obtained in the step #25, the operation of the RFID-tag producing apparatus 1 is terminated.

FIG. 12 shows an example of the printed image formed and the information written on the accessory tag 101b, while FIG. 13 shows an example of the printed image formed and the information written on the accessory tag 101e. The printed image formed on the accessory tag 101b reads "A-ADAPTER", while the printed image formed on the accessory tag 101e reads "A-CABLE 1". The information of the main article 60 and the information of the accessory article 61 are stored in the memory 116 of the accessory tag 101b, while the information of the main article 60 and the information of the accessory article 64 are stored in the memory 116 of the accessory tag 101e. The above description applies to the other accessory tags 101c-101d, 101f and 101h.

If only the printing operation is performed on the tape 22, without the writing operation, the control flow goes to step #41 to transmit the printing information to the RAM 82 of the control circuit 2. In the following step #42, the printing operations are performed on the tape 22, according to the items of the printing information corresponding to the articles 60-67, as described above with respect to the steps #16 and #17.

In the manner described above, the main tag 101a and the plurality of accessory tags 101b-101h are produced, and are attached to the respective articles 60-67, as shown in FIG. 14. The articles 60-67 constitute a set of articles. In the present embodiment, the main tag 101a is attached to the measuring device A, while the accessory tags 101b-101h are respectively attached to the articles 61-67 named "A-adapter", "A-card 1", "A-card 2", "A-cable 1", "A-cable 2", "A-cord" and "A-instruction manual".

In the step #17, the printed image 102a reading "MEASURING DEVICE A" may be printed in bold for easy visual recognition that the article 60 to which the main tag 101a is attached is the main article.

There will be described an operation of the article management device 31 of the article management system of the present embodiment, to control the articles 60-67, by using the main tag 101a and the accessory tags 101b-101h. Referring to the perspective view of FIG. 15, the article management device 31 is hand-held by the user during its use, and is provided on its upper surface with an operator's control portion 32 and a display portion (indicator portion) 33, and on its front surface with an antenna 57.

The operator's control portion 32 has a plurality of control keys operable by the user. The display portion 33 is a liquid crystal display (LCD) which indicates states of operation of the article management device 31 and results of communication with the RFID tags 101. The display portion 33 may be a cathode ray tube (CRT) or organic EL. The operator's control portion 32 may be replaced by a touch panel operable on the display portion 33.

Figure 16:
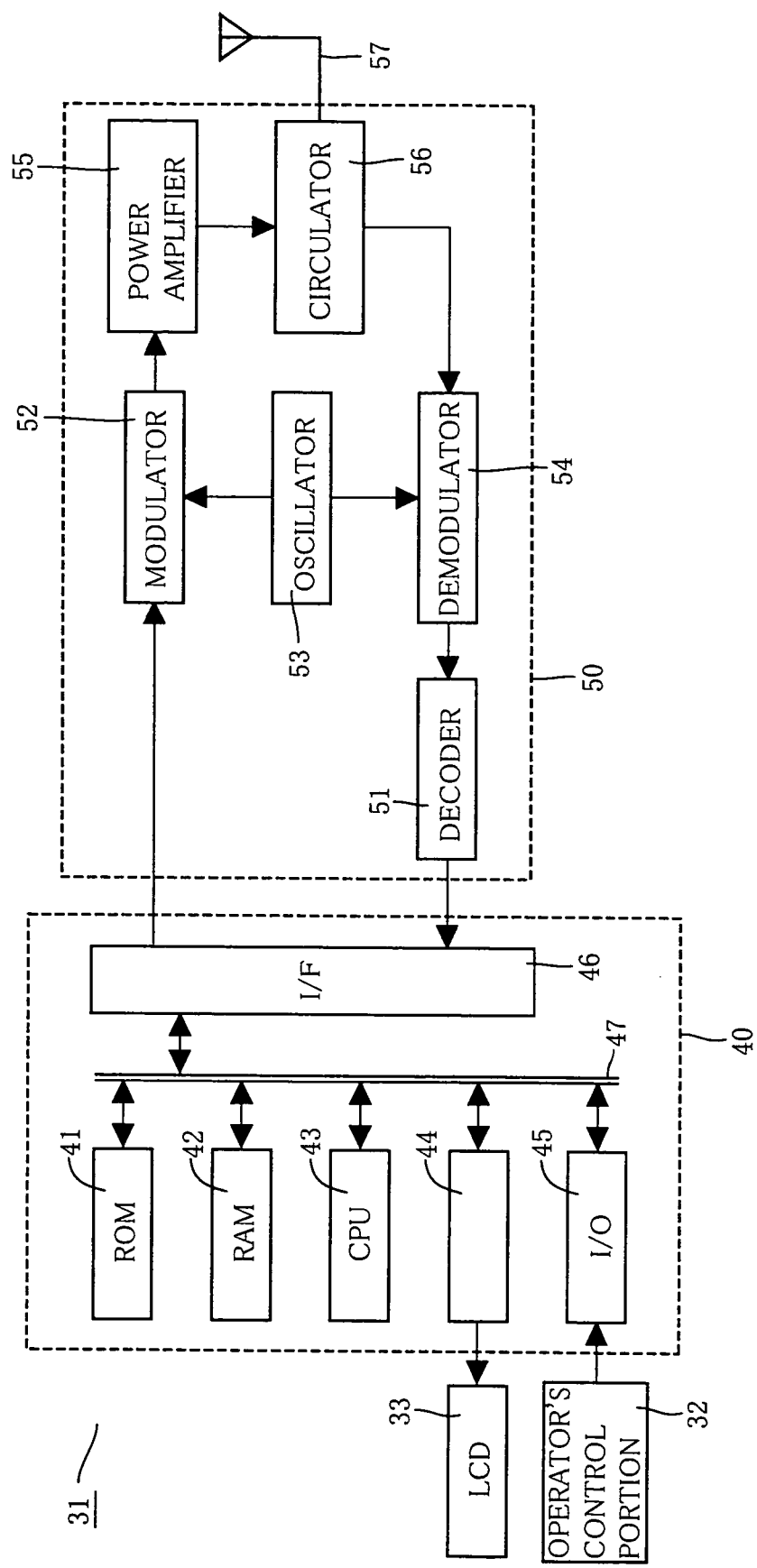
FIG. 16 is a block diagram showing an arrangement of the article management device.

Referring to the block diagram of FIG. 16, the article management device 31 includes a control portion 40 and a radio-frequency portion (communicating portion) 50. The control portion 40 incorporates a CPU 43 for controlling various other portions of the article management device 31. To the CPU 53, there are connected through a bus line a ROM 41, a RAM 52, a LCD driver 44, an I/O portion 45 and an interface circuit 46.

The ROM 41 stores control programs used by the CPU 43, and the RAM 42 temporarily stores data during an arithmetic operation of the CPU 43. The LCD driver 44 is connected to the display portion 33, to drive the display portion 33. The I/O portion 45 is connected to the operator's control portion 32, to receive control signals from the operator's control portion 32 and apply the control signals to the CPU 43. The interface circuit 46 is connected to the radio-frequency circuit 50, for transmission and reception of signals between the control portion 40 and the radio-frequency circuit 50.

The high-frequency circuit 50 includes a circulator 56 which is connected to an antenna 57 and through which information is selectively transmitted to or received from the RFID tags 101. Between the circulator 56 and the interface circuit 46, there is connected a power amplifier 55 and a modulator 52. An oscillator 53 is connected to the modulator 52.

The modulator 52 is operable to modulate information received through the interface circuit 46, according to a radio frequency (within a band of 900 MHz or 2.45 GHz) generated by the oscillator 53. The power amplifier 55 is operable to amplify a signal modulated by the modulator 52, so that information read out from the RAM 42 is input through the interface circuit 46 to the modulator 52, modulated by the modulator 52 according to the radio frequency, amplified by the power amplifier 55, and transmitted from the circulator 56.

Between the circulator 56 and the interface circuit 46, there are connected a decoder 51 and a demodulator 54. The demodulator 54 is connected to the oscillator 53. The demodulator 54 is operable to demodulate a signal received through the antenna 57, according to the radio frequency generated by the oscillator 53. The decoder 54 is operable to decode the demodulated signal. Thus, the signal received from the RFID tags 101 through the antenna 57 is demodulated by the demodulator 54, decoded by the decoder 51, and applied to the control portion 40 through the interface circuit 46.

Figure 17:
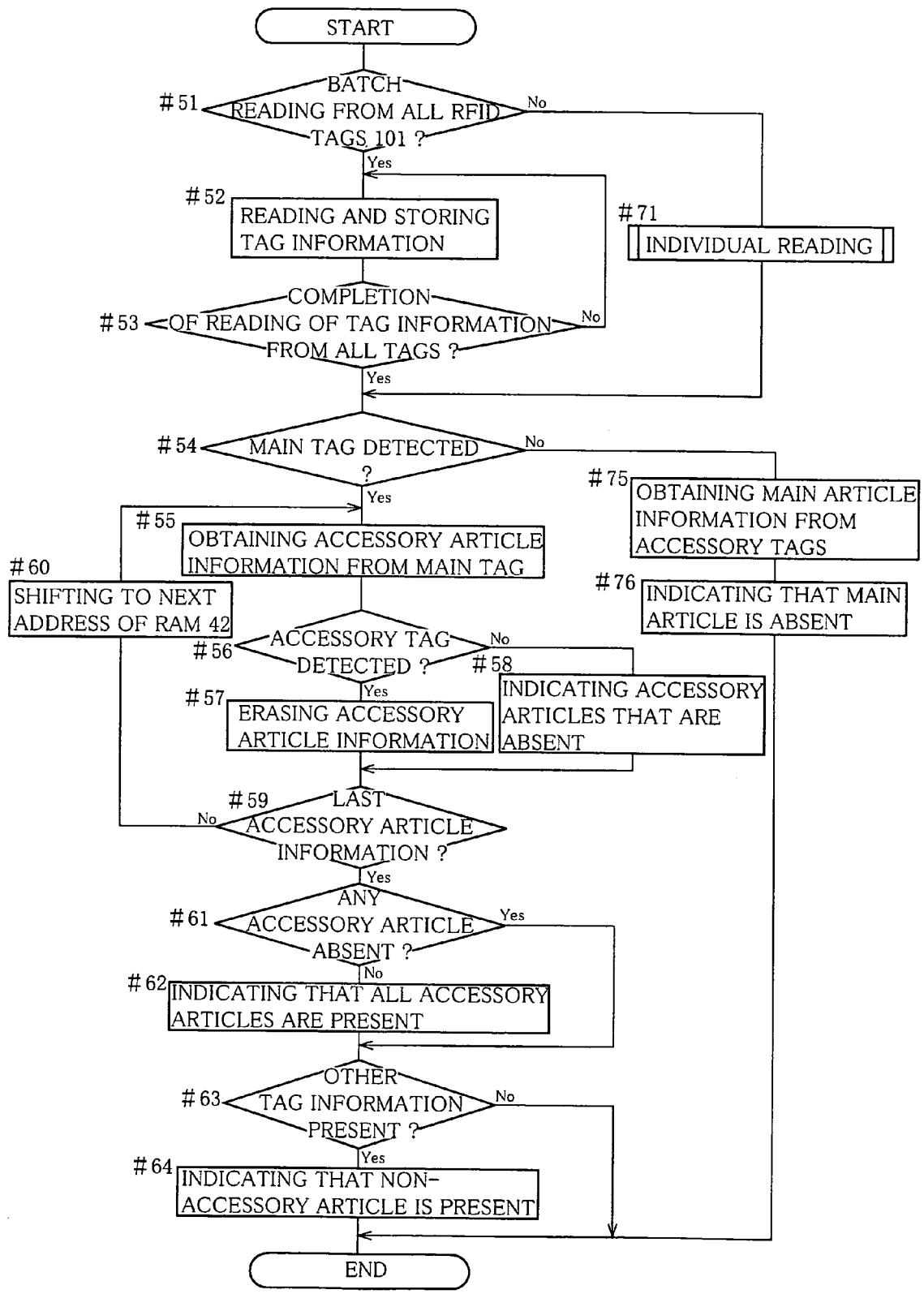
FIG. 17 is a flow chart illustrating an operation of the article management device.

In the article management device 31 constructed as described above, a control routine illustrated in the flow chart of FIG. 17 is executed by the control portion 40 according to an operation through the operator's control portion 32. The control routine is initiated with step #51 to determine whether batch reading is desired to read the information from all of the RFID tags 101, without selecting the RFID tags 101, or individual reading is desired to read the information from the RFID tags 101 as the RFID tags 101 are sequentially selected. If the batch reading is effected, the control flow goes to step #52.

In the step #52, the information written on the memories 116 of the RFID tags 101 attached to the articles 60-67 are read out by communication with the RFID tags 101. The read-out information are stored in the RAM 42 of the article management device 31. Then, the control flow goes to step #53 to determine whether the information has been read out from all of the RFID tags 101. If a negative decision (No) is obtained in the step #53, the control flow goes back to the step #52. The steps S52 and #53 are repeatedly implemented until the information has been read out from all of the RFID tags 101 and stored in the RAM 42.

If an affirmative decision (Yes) is obtained in the step #53, the control flow goes to step #54 to determine whether the main tag 101a was detected or not (is present or not), namely, whether the information read out from the RFID tags 101 includes the information read out from the main tag 101a. This determination is made by determining whether the information read out from the RFID tags 101 includes the information indicating the at least three articles, as indicated in FIG. 11. Where the set of articles consists of only two articles including the main article 60, the item of information read out from the main tag 101a is identical with the item of information read out from the accessory tag. Therefore, if the two items of information read out from the two RFID tags 101 are identical with each other, one of these two RFID tags 101 can be determined to be the main tag 101a.

Figure 19:
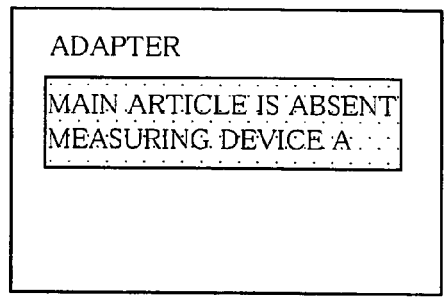
FIG. 19 is a view showing a view provided a display portion of the article management device.

If the main tag 101a was not detected, the control flow goes to step #75 to obtain the information of the main article 60 (hereinafter referred to as "main article information") from the accessory tags 101b-101h. The main article information is the first item of information written on each accessory tag 101b-101h. Step #76 is then implemented to command the display portion 33 to provide an indication "MAIN ARTICLE IS MISSING", and indicate the printed image "MEASURING DEVICE A" indicative of the main article 60, as indicated in FIG. 19, so that the user is informed of the missing of the main article 60. In this case, one cycle of execution of the control routine of FIG. 17 is terminated. Accordingly, the user can recognize the missing of the main article 60, and deal with this problem.

If an affirmative decision (Yes) is obtained in the step #54, that is, if the main tag 101a was detected, the control flow goes to step #55 to obtain the information of the accessory article (hereinafter referred to as "accessory article information") from the main tag 101a. When the step #55 is initiated for the first time, the accessory article information of the first accessory article 61 is obtained from the main tag 101a. Then, the control flow goes to step #56 to determine whether the accessory tag 101b-101h corresponding to the obtained accessory article information was detected (is existing or not). This determination is made by comparing the information read out from each accessory tag 101b-101h, with the obtained accessory article information.

If a negative decision (No) is obtained in the step #56, that is, if none of the information read out from the accessory tags 101b-101h is identical with the accessory article information obtained from the main tag 101a, the control flow goes to step #58 to command the display portion 33 to inform the user of the accessory articles that are missing. The step #58 is followed by step #59. If an affirmative decision (Yes) is obtained in the step #56, that is, if the information read out from any one of the accessory tags 101b-101h is identical with the accessory article information obtained from the main tag 101a, the control flow goes to step #57 to erase the accessory article information in question from the RAM 42. The step #57 is also followed by the step #59.

The step #59 is implemented to determine whether the accessory article information read out from the main tag 101a is the last article information of the last accessory article 67. If a negative decision (No) is obtained in the step #59, the control flow goes to step #60 to shift a pointer of the RAM 42 to the next address and goes back to the step #55 to read out the next accessory article information from the RAM 42. The steps #55-#60 are repeatedly implemented until the last accessory article information read out from the main tag 101a has been compared with the information from the accessory tags 101b-101h. If an affirmative decision (Yes) is obtained in the step #59, the control flow goes to step #61.

Figure 20:
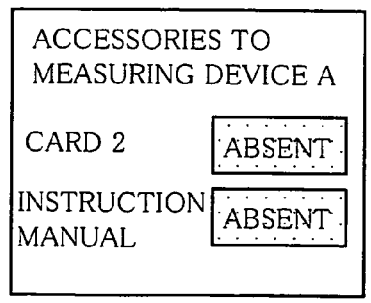
FIG. 20 is a view showing another view provided on the display portion of the article management device.

If any of the accessory articles 61-67 is missing, the display portion 33 indicates the accessory articles that are missing, as indicated in FIG. 20, as described above. Where all of the accessory articles 61-67 are present, the display portion 33 may indicate a list of those accessory articles, together with an indication that all of the accessory articles are existing.

The above-indicated step #61 is implemented to determine whether any one of the accessory articles 61-67 is missing, that is, whether the missing of any accessory article is indicated on the display portion 33. If an affirmative decision (Yes) is obtained in the step #61, the control flow goes to step #63. If a negative decision (No) is obtained in the step #61, the control flow goes to step #62 to command the display portion 33 to inform the user that all of the accessory articles are existing, as indicated in FIG. 21. The step #63 is implemented to determine whether the information read out from the RFID tags 101 and stored in the RAM 42 include information other than the accessory article information of the accessory articles 61-67.

If a negative decision (No) is obtained in the step #63, one cycle of execution of the present control routine is terminated. If an affirmative decision (Yes) is obtained in the step #63, that is, if any information other than the information read out from the accessory tags 101b-101h is stored in the RAM 42, the control flow goes to step #64 to command the display portion 33 to provide an indication that a non-accessory article or articles other than the main article 60 and the accessory articles 61-67 is/are included in the set of articles, and to indicate the information written on the RFID tag 101 attached to the non-accessory article, as indicated in FIG. 22 or 23. One cycle of execution of the present control routine is terminated with the step #64.

Figure 18:
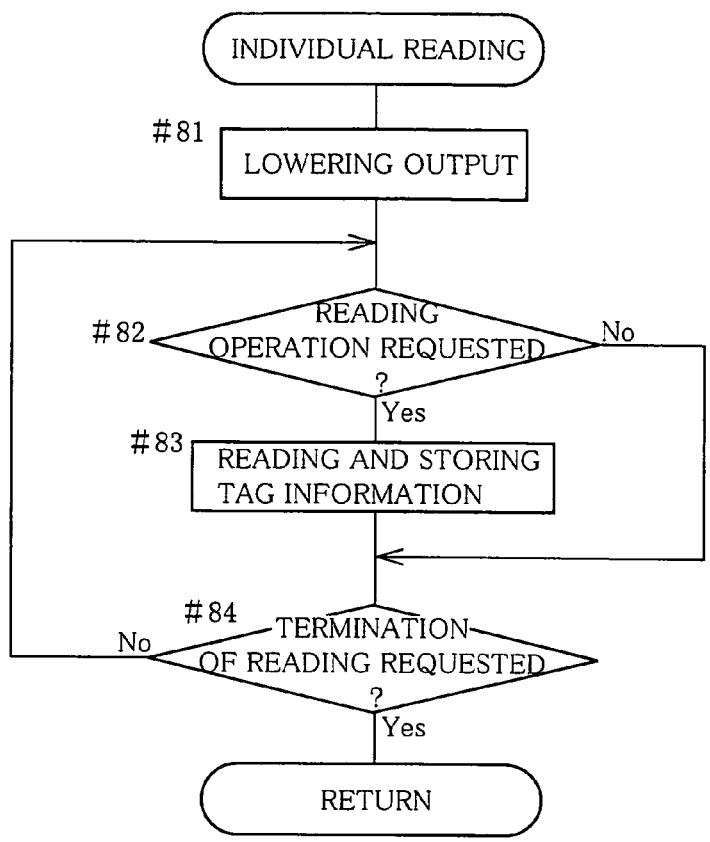
FIG. 18 is a flow chart illustrating the individual writing by the article management device.

If a negative decision (No) is obtained in the step #51, that is, if the individual reading is desired, the control flow goes to step #71 to effect the individual reading according to a control routine illustrated in the flow chart of FIG. 18. This control routine is initiated with step #81 in which the control portion 40 lowers the gain of the power amplifier 55, for reducing the transmission output of the radio-frequency portion 50 as compared with that in the batch reading, so that the radio-frequency portion 50 is communicable with the RFID tags 101 which are located within an area close to the article management device 31. Step #82 is then implemented to determine whether the operator's control portion 32 has been operated to request the reading of the information from a selected one of the RFID tags 101.

If a negative decision (No) is obtained in the step #82, the control flow goes to step #84. If an affirmative decision (Yes) is obtained in the step #82, the control flow goes to step #83 to read the information stored in the memory of the RFID tag 101 attached to the article which is located close to the article management device 31 as a result of a movement of the article management device 31. The information thus read out from the RFID tag 101 in question is stored in the RAM 42 of the article management device 31.

The step #84 is provided to determine whether the operator's control portion 32 has been operated to request the termination of the individual reading. If a negative decision (No) is obtained in the step #84, the control flow goes back to the step #82, and repeat the steps #82-#84 until an affirmative decision (Yes) is obtained in the step #84. Thus, the information stored in the RFID tags 101 are sequentially read out and stored the RAM 42 by operating the operator's control portion 32 to request the information reading. If the affirmative decision (Yes) is obtained in the step #84, that is, if the operator's control portion 32 has been operated to request the termination of the individual reading, the control flow goes back to the step #54 of the flow chart of FIG. 17.

As described above, the information is read out from the RFID tags 101 attached to the articles 60-67. Where there is a high possibility that a relatively large number of articles other than the set of the articles 60-67 are existing within an area of communication of the article management device 31, the individual reading facilitates checking of the information given on the display portion 33. The individual reading may be initiated with the reading of the information from the main tag 101a attached to the main article 60, followed by the individual sequential reading of the information from the accessory tags 101b-101h attached to the accessory articles 61-67. In this case, the checking of the information given on the display portion 33 is effected when the information has been read out from each of the accessory tags 101b-101h, so that it is possible to easily check whether the article from which the information has been read out is one of the accessory articles 61-67 of the set.

In the present embodiment of this invention, the information identifying all of the plurality of articles 60-67 handled as a set are written on the main tag (first RFID tag) 101a, while the information identifying the main article (first article) 60 and the information identifying the accessory article 61-67 accompanying the main article 60 are written on each of the accessory tags (second RFID tags) 101b-101h. Accordingly, the present embodiment permits easy determination or detection of any one of the articles 60-61 of the set, thereby facilitating the management of the articles 60-67.

The RFID-tag producing apparatus 1 according to the present embodiment is arranged such that the information indicating the names or otherwise identifying the set of articles 60-67 consisting of the main article 60 and the accessory articles 61-67 is input through the input portion 16 so that the information identifying all of the articles 60-67 are stored in the main tag 101a to be attached to the main article 60, while the information identifying the main article 60 and the information identifying each of the accessory articles 61-67 are stored in the corresponding one of the accessory tags 101b-101h to be attached to the accessory articles 61-67, as shown in FIG. 14. The names stored in the accessory tags 101b-101h are compared with the names stored in the main tag 101a, to thereby management the articles 60-67. The input portion 16 may be an operator's control portion of the RFID-tag producing apparatus 1 or may be arranged to receive information from an external device such as a personal computer through a cable or in a wireless fashion. Where the RFID tags 101 have a relatively small storage capacity, the information identifying the articles 60-67 is stored in an external data base, and each of the RFID tags 101 stores information indicative of the addresses of the data base, for example.

In the present RFID-tag producing apparatus 1, the information identifying the articles 60-67 is input through the input portion 16, so as to distinguish the first article 60 and the other articles 61-67 of the set from each other, and the information distinguishing the main tag 101a and the accessory tags 101b-101h from each other is generated by the control portion 2, on the basis of the identifying information input through the input portion 16, and written on the main tag 101a and the accessory tags 101b-101h, so that the main tag 101a and the accessory tags 101b-101h can be recognized on the basis of the information which is written on and read from the tags 101a-101h.

In the present RFID-tag producing apparatus 1, the tape 22 accommodated in the form of a roll in the cartridge 20 is fed and cut into successive labels each including the RFID-tag circuit 108 and having a predetermined length, by the label making portion constituted by the cartridge driver circuit 3, cartridge driver stepping motor 4, feed-roller driver circuit 6, feed rollers 15, solenoid 12 and cutter 13. The RFID-tag circuits 108 are arranged on the tape 22 at a predetermined interval in the longitudinal direction of the tape 22, and the information is written in the RFID-tag circuits 108, to produce the RFID tags 101a-101h which store the information identifying the respective articles 60-67. The RFID-tag circuits 108 are bonded to or laminated on the tape 22.

The RFID-tag producing apparatus 1 of the present embodiment is provided with the printer driver circuit 5 and the thermal print head 24, which function as the printing portion operable to perform a printing operation on the tape 22, so that the printed image 102a indicative of the name of each article, for example, is formed on the tape 22, so that each RFID tag 101 produced carries the printed image 102a as well as stores the information of the article.

The printing portion constituted by the printer driver circuit 5 and the thermal print head 24 performs the printing operation on the tape 22 which incorporates the RFID-tag circuits 108, so that the RFID tags 101 produced by storing the information in the RFID-tag circuits 108 in the labels obtained by cutting the printed tape 22 carry the printed images 102a.

The present RFID-tag producing apparatus 1 is further arranged such that the information printed on the tape 22 by the printer driver circuit 5 and the thermal print head 24 is written on the main tag 101a and the accessory tags 101b-101h under the control of the control portion 2, so that the information written on each of the RFID tags 101a-101h corresponds to the information printed on the tape 22.

The article management system including the RFID-tag producing apparatus 1 and the article management device 31 may be used to merely inform the user of the existing and missing of the articles 60-67 of the set, by comparing the number of the articles identified by the information read out from the main tag 101a, with the number of the RFID tags 101 from which the information has been received by the article management device 31.

Since the RFID tags 101 carry the printed images 102a formed on the tape 22 incorporating the RFID-tag circuits 108, the articles can be easily visually recognized from the printed images 102a on the RFID tags 101 bonded to the articles through the tacky layer 106 of the tape 22. While the present embodiment is arranged to perform the printing operation on the tape 22 incorporating the RFID-tag circuits 108, the printing operation may be performed on separate media in the form of labels such as cut sheets provided with the RFID-tag circuits 108 on which the information is subsequently written to produce the RFID tags 101.

There will be described an article management system according to a second embodiment of this invention. This article management system includes an RFID-tag producing apparatus which is similar to the RFID-tag producing apparatus 1 of the first embodiment and which is arranged to input, through the input portion 16 or an external personal computer, the following information: information (hereinafter referred to as "compatibility information") indicative of articles compatible or interchangeable with the main article 60 and the accessory articles 61-67; information identifying the main article 60 and the accessory articles 61-67; and information indicative of the number of the articles 60-67 of the set. In the other aspects, the article management system of the present second embodiment is the same as that of the first embodiment.

Figure 8:
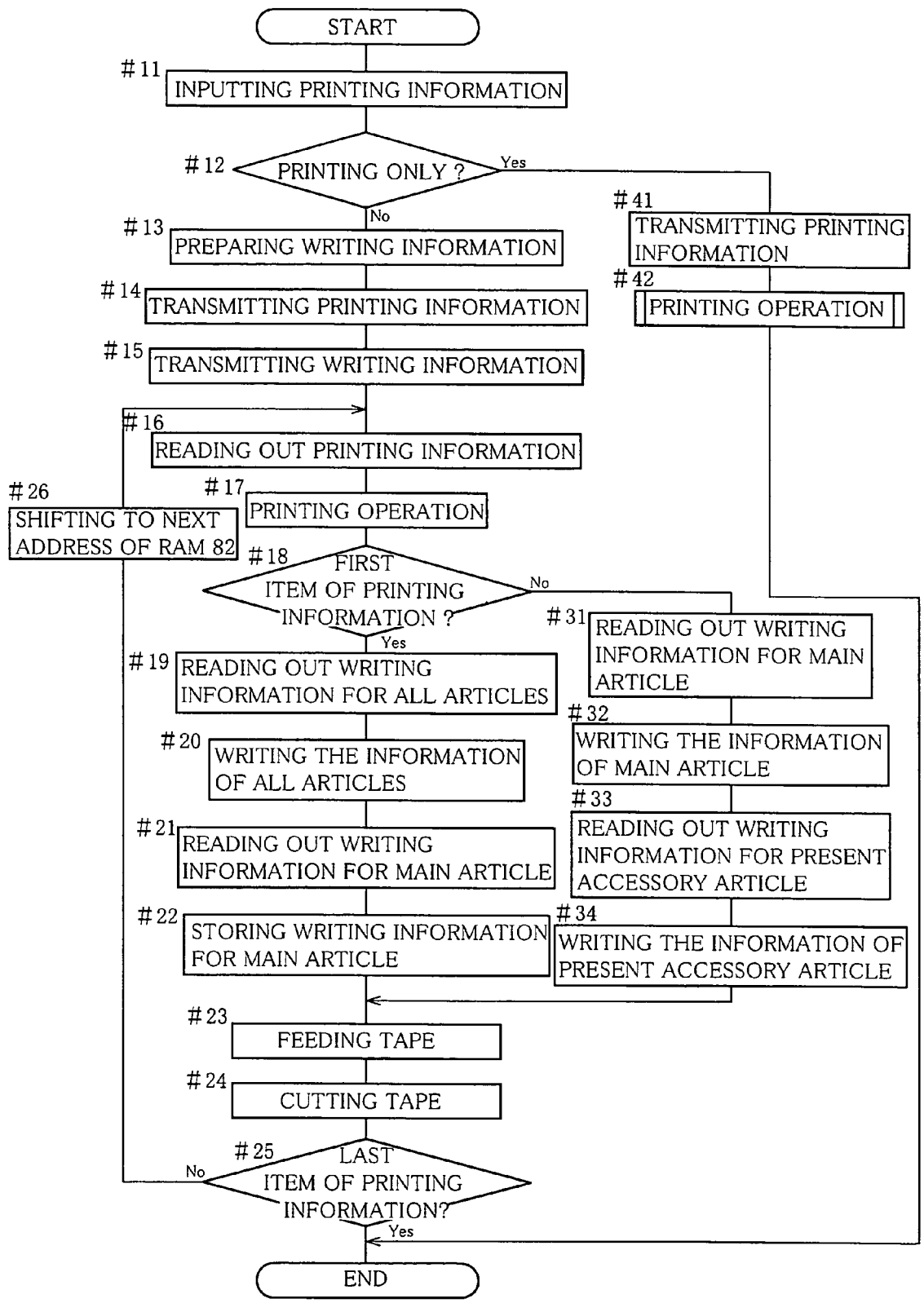
FIG. 8 is a flow chart illustrating an operation of the RFID-tag producing apparatus of the first embodiment of the invention.

In the step #11 of the flow chart of FIG. 8, the printing information for the printing operation on the tape 22 and the compatibility information are received from an external device such as a personal computer through the interface circuit 18, or input through the input portion 16. FIG. 24 shows an example of the printing information and the compatibility information, which include the information indicative of the name "MEASURING DEVICE A" of the main article 60 (first article), the information indicative of the name "MEASURING DEVICE D" compatible or interchangeable with the measuring device A, the information indicative of the names of the accessory articles 61-67, and the information indicative of the names of the articles compatible or interchangeable with the accessory articles 61-67. Although the compatibility information indicates the names of the compatible articles in the present embodiment, the compatibility information may be any sort of information specifying the compatible articles.

In the step #13, the writing information for writing the printing information and the compatibility information of all articles 60-67 is generated. The compatibility information may be prepared and stored in a data base, so that the writing information for the articles 60-67 is generated by reference to the data base when the printing information of the articles 60-67 is input.

FIG. 25 shows an example of the printed image formed on the main tag 101a, and the information written on the main tag 101a in the step #20, which includes the compatibility information, as well as the printing information of the articles 60-67, and the ID numbers of the articles 60-67. The information written on the main tag 101a further includes identification information "M" identifying the main tag 101a, and information "7" indicative of the number of the accessory articles 61-67.

FIGS. 26 and 27 show examples of the printed images formed on the respective accessory tags 101b and 101e, and the information written on the accessory tags 101b and 101e in the steps #32 and #34, which includes the compatibility information, as well as the printing information of the articles 61 and 64, and the ID numbers of the articles 61 and 64. The information written on the accessory tags 101b and 101e further include identification information "S" identifying the accessory tags 101b, 101e, and serial number information "1" or "4" identifying the accessory article 61 or 64.

Referring back to the flow chart of FIG. 17, there will be described an operation of the article management device 31 of the present article management system arranged to administer the articles 60-67 to which are attached the main tag 101*a* and accessory tags 101*b*-101*h* on which the identifying information and the compatibility information are written. The steps in the present second embodiment which are identical with those in the first embodiment will not be described. In the step #54, the determination as to whether the main tag 101*a* was detected is made on the basis of the identification information "M" (shown in FIG. 25). Thus, the determination can be efficiently made by merely checking the identifying information read out from the main tag 101*a*.

In the step #56, the information read out from the accessory tags 101*b*-101*h* are compared with the printing information of the accessory articles 61-67 read out from the main tag 101*a*, to determine whether the information read out from any one of the accessory tags 101*b*-101*h* is not coincident with the printing information of any accessory article 61-67 read from the main tag 101*a*, that is, to find any of the accessory articles 61-67 which is missing. If any one of the accessory articles 61-67 is found to be missing, the compatibility information read from the accessory tags 101 is compared with the compatibility information read out from the main tag 101*a*, to find any accessory article compatible with the accessory article 61-67 which has been found to be missing. If any accessory article compatible with the article which is missing is found, the step #56 is not followed by the step #58 of indicating the detection of the accessory article which is missing, but is followed by the step #57. In this case, the display portion 33 may be commanded to provide an indication that the compatible accessory article is provided in place of the accessory article which is missing.

If the missing of the main tag 101*a* is detected in the step #54, the control flow goes to the step #75 to read the information of the main article 60 and the compatibility information from the accessory tags 101*b*-101*h*, and then goes to the step #76 to provide not only an indication that the main article 60 is missing, but also an indication that the main article 60 may be replaced by a compatible article, so that the user can easily prepare the compatible article and replace the missing main article 60 with the compatible article.

In the present second embodiment, the compatibility information of the accessory articles 61-67 is written on the main tag 101*a* (first RFID tag), so that the user can easily recognize that any accessory article 61-67 which is missing is replaced by the compatible article. Further, the compatibility information of the main article 60 is written on the accessory tags 101*b*-101*h* (second RFID tags), so that the user can easily prepare the compatible article and replace the missing main article 60 with the compatible article.

In the RFID-tag producing apparatus 1 of the present second embodiment, the information indicative of the number of the articles 60-61 of the set is written on the main tag 101*a* on the basis of the information input through the input portion 16, so that any one of the articles 60-67 which is missing can be detected by comparing the number of the RFID tags 101 from which the information has been received, with the number of the articles written on the main tag 101*a*.

The present RFID-tag producing apparatus is arranged to input through the input portion 16 the compatibility information indicative of the articles compatible with the articles 60-61, so that the information identifying the individual articles and the compatibility information are written on the main tag 101*a* and the accessory tags 101*b*-101*h* under the control of the control circuit 2, on the basis of the information input through the input portion 16. Namely, the names of the main article 60 and the accessory articles 61-67 which are shown in FIG. 14, and the names of the articles compatible with the main and accessory articles 60-67 are input to write the information of the main and accessory articles 60-67 and the compatibility information on the main and accessory tags 101*a*-101*h*. If there exists an article which is compatible with any one of the articles which is found to be missing, the display portion 33 provides an indication that all of the articles 60-67 are existing, or that the article which is missing is replaceable with a compatible article. The compatibility information may be prepared and stored in a data base, so that the compatibility information is written on the main tag 101*a* and accessory tag 101*b*-101*h* by reference to the data base when the information of the articles 60-67 is input.

The article management system of the second embodiment may be used to merely inform the user of the existing and missing of the articles 60-67 of the set, by comparing the number "7" (FIG. 25) of the articles indicated by the information read out from the main tag 101*a*, with the number of the RFID tags 101 from which the information has been received by the article management device 31. The present embodiment permits more efficient detection of the missing of any of the articles, than the first embodiment.

While the preferred embodiments of this invention have been described in detail by reference to the accompanying drawings, it is to be understood that the present invention is not limited to the details of the illustrated embodiments, but may be otherwise embodied.

While the illustrated embodiments are arranged to produce and use the RFID tags 101*a*-101*h* to be attached to the main article 60 and accessory articles 61-67 which are handled as a set, the principle of the present invention is equally applicable to the production and use of a plurality of RFID tags consisting of a main tag (first tag) attached to one of a plurality of desired articles to be handled as a set, and at least one accessory tag (second tag) attached to the other article or articles. For instance, the set of articles consists of a personal computer, CD-ROMs, instruction manuals, samples, etc., or a container for transportation, and articles contained in the container.

In the illustrated embodiments, the various kinds of information are stored in the memory of each RFID tag. However, the various kinds of information may be stored as a data base, and the memory of each RFID tag stores information indicative of the address of the data base. In this case, the required storage capacity of the memory can be reduced.

It is to be understood that the present invention may be embodied with various other changes not specifically described, without departing from the spirit of the invention.

What is claimed is:

1. An article management device operable to read out information written on a plurality of RFID tags respectively attached to a plurality of articles handled as a set, for management of the plurality of articles, said plurality of articles consisting of a first article and at least one second article other than said first article, and said plurality of RFID tags including a first RFID tag attached to the first article, and at least one second RFID tag attached to said second articles, said article management device comprising:

a communicating portion operable to read out information of all of said plurality of articles written on said first RFID tag, and information of each of said second articles and information of said first article which are written on said second RFID tag;

a control portion operable to effect a comparison of the information read out from said first RFID tag, with the information read out from said second RFID tag; and an indicator portion operable to indicate a result of said comparison effected by said control portion.

2. The article management device according to claim 1, wherein said control portion commands said indicator portion to indicate missing of said at least one second article, when said control portion has determined that there is information which is not included in the information read out from all of the second RFID tags and included in the information read out from the first RFID tag.

3. The article management device according to claim 1, wherein said control portion compares the information which has been read out from said first RFID tag in every article by said communicating portion and which indicates said second article, sequentially with the information read out from said second RFID tag by said communicating portion, and commands said indicator portion to indicate the result of the comparison in every article by said control portion, when the information read out from said first RFID tag is compared with the information read out from said second RFID tag.

4. The article management control device according to claim 1, wherein said control portion commands said indicator portion to indicate missing of said first article together with the information of the first article, on the basis of the information read out from said second RFID tag, when said communicating portion has not received the information from said first RFID tag.

5. The article management device according to claim 4, wherein said control portion commands said indicator portion to indicate the missing of said first article together with the information of the first article, on the basis of the information read out from said second RFID tag, when said communicating portion has not received identification information identifying said first RFID tag, from said first RFID tag.

6. The article management device according to claim 4, wherein said control portion commands said indicator portion to indicate the missing of said first article together with the information of the first article, on the basis of the information read out from said second RFID tag, when said communicating portion has not received information indicative of three articles of said plurality of articles, from any of said plurality of RFID tags.

7. The article management device according to claim 1, wherein said control portion commands said indicator portion to indicate existing of an article other than said plurality of articles handled as the set, when said communicating portion has received information from an RFID tag not corresponding to any one of the information which have been read out from said first RFID tag.

8. The article management device according to claim 1, wherein compatibility information indicative of compatible article each interchangeable with any one of said plurality of articles is written on said first RFID tag, and when said control portion has determined that there is information which is not included in the information read out from all of the second RFID tags and included in the information read out from the first RFID tag, and that the information read out from said second RFID tag includes information indicative of one of said compatible article indicated by said compatibility information read out from said first RFID tag, said control portion determines that one of said compatible article which is interchangeable with said second article is existing, rather than determines that said second article is missing.

9. The article management device according to claim 1, wherein said indicator portion includes a display portion operable to display the result of said comparison effected by said control portion.

10. The article management device according to claim 9, wherein said control portion commands said display portion to display the information of said second article, on the basis of the information read out from said first RFID tag or said second RFID tag, when the comparison effected by said control portion reveals the missing of said second article.

11. The article management device according to claim 9, wherein said control portion commands said display portion to display information of article other than said plurality of articles handled as the set, on the basis of the information read out from said second RFID tag, when the comparison effected by said control portion reveals the existing of said article other than said plurality of articles.

12. The article management device according to claim 9, wherein said control portion commands said display portion to display information of compatible article each interchangeable with any one of said second article, on the basis of the information read out from said second RFID tag, when the comparison effected by said control portion reveals the existing of said compatible article.

13. The article management device according to claim 9, wherein compatibility information indicative of compatible article each interchangeable with said first article is written on said second RFID tag, and when the comparison effected by said control portion reveals the missing of said first article, said control portion commands said display portion to display the information of said first article and information of said compatible article.

14. An article management system operable to write information on a plurality of RFID tags to be respectively attached to a plurality of articles handled as a set, and read out the information from said plurality of RFID tags, for management of the plurality of articles, said plurality of articles consisting of a first article and at least one second article other than said first article, said plurality of RFID tags including a first RFID tag to be attached to the first article, and at least one second RFID tag to be attached to said second article, said article management system comprising:

an RFID-tag producing apparatus operable to write information of all of said plurality of articles on said first RFID tag, and information of each of said second article and information of said first article on said each of said second RFID tag, on the basis of information input thereto; and an article management device including a communicating portion operable to read out the information of all of said plurality of articles from said first RFID tag, and the information of each of said second article and the information of said first article from said second RFID tag, a control portion operable to effect a comparison of the information read out from said first RFID tag, with the information read out from said second RFID tag, and an indicator portion operable to indicate a result of said comparison by said control portion.

15. The article management system according to claim 14, wherein said RFID-tag producing apparatus is operable to write identification information identifying said first RFID tag on said first RFID tag, and identification information identifying said second RFID tag on said second RFID tag.

16. The article management system according to claim 14, wherein said RFID-tag producing apparatus is operable to write information indicative of the number of all of said plurality of articles, on said first RFID tag.

17. The article management system according to claim 14, wherein said RFID-tag producing apparatus includes a printing portion operable to perform a printing operation on a medium which incorporates said plurality of RFID tags.

18. The article management system according to claim 14, wherein said control portion commands said indicator portion to indicate the missing of said second article when said control portion has determined that there is information which is not included in the information read out from all of the second RFID tags and included in the information read out from the first RFID tag.

19. The article management system according to claim 14, wherein said control portion commands said indicator portion to indicate the missing of said first article together with the information of the first article, on the basis of the information read out from said second RFID tag, when said communicating portion has not received the information from said first RFID tag.

20. An article management method for management of a plurality of articles handled as a set, by writing information on a plurality of RFID tags to be respectively attached to said plurality of articles, and reading out the information from said plurality of RFID tags, said plurality of articles consisting of a first article and at least one second article other than said first article, said plurality of RFID tags including a first RFID tag to be attached to the first article, and at least one second RFID tag to be attached to said second article, said article management method comprising:

reading out information of all of said plurality of articles from said first RFID tag attached to said first article, and information of each of said second article and information of said first article from said second RFID tag attached to said second article in block;

effecting a comparison of the information read out from said first RFID tag, with the information read out from said second RFID tag; and indicating a result of said comparison.

21. An RFID-tag producing apparatus operable to write information on a plurality of RFID tags to be respectively attached to a plurality of articles handled as a set, said plurality of articles consisting of a first article and at least one second article other than said first article, said plurality of RFID tags including a first RFID tag to be attached to said first article, and at least one second RFID tag to be attached to said second article, said RFID-tag producing apparatus comprising:

an input portion operable to input information specifying each of all of said plurality of articles; and a control portion operable to write information of all of said plurality of articles on said first RFID tag, and information each of said second article and information of said first article on said each of said second RFID tag, on the basis of the information input by said input portion.

22. The RFID-tag producing apparatus according to claim 21, wherein the information input through said input portion specifies each of said plurality of articles so as to distinguish said first article and said second article from each other, and said control portion is operable to generate identification information identifying said first RFID tag and said second RFID tag, on the basis of the information input through said input portion, and writes the generated identification information on said first and second RFID tags.

23. The RFID-tag producing apparatus according to claim 21, wherein said control portion is operable to write information indicative of the number of all of said plurality of articles on said first RFID tag, on the basis of the information input through said input portion.

24. The RFID-tag producing apparatus according to claim 21, wherein said control portion is operable to write compatibility information indicative of compatible article each interchangeable with said plurality of articles, together with the information specifying each of the plurality of articles, on said first and second RFID tags, when said compatibility information is input through said input portion.

25. The RFID-tag producing apparatus according to claim 21, further comprising a cartridge in which a roll of a tape is accommodated, and a label making portion operable to cut said tape fed from said roll into labels each having a predetermined length.

26. The RFID-tag producing apparatus according to claim 25, further comprising a printing portion operable to perform a printing operation on said tape.

27. The RFID-tag producing apparatus according to claim 26, wherein said control portion is operable to write information printed by said printing portion, on said first and second RFID tags.

28. The RFID-tag producing apparatus according to claim 21, further comprising a printing portion operable to perform a printing operation on a medium which incorporates a plurality of RFID-tag.

* * * * *